US012674049B2

(12) United States Patent
Leaf et al.

(10) Patent No.: US 12,674,049 B2
(45) Date of Patent: Jul. 7, 2026

(54) POLYMER PROCESSING AIDS

(71) Applicant: ExxonMobil Technology and Engineering Company, Spring, TX (US)

(72) Inventors: Michael A Leaf, Baytown, TX (US); Danny Van Hoyweghen, Heverlee (BE); Haiqing Peng, Sugar Land, TX (US); Petra M. Eiselt, Houston, TX (US); Luke A. Galuska, Crosby, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 0 days.

(21) Appl. No.: 19/011,814

(22) Filed: Jan. 7, 2025

(65) Prior Publication Data

US 2026/0117053 A1 Apr. 30, 2026

Related U.S. Application Data

(60) Provisional application No. 63/712,136, filed on Oct. 25, 2024.

(51) Int. Cl.

| | |
|---|---|
| ***C08L 23/0807*** | (2025.01) |
| ***B29C 48/00*** | (2019.01) |
| ***B29C 48/10*** | (2019.01) |
| ***B29K 23/00*** | (2006.01) |
| ***B29K 67/00*** | (2006.01) |
| ***B29K 77/00*** | (2006.01) |
| ***B29K 85/00*** | (2006.01) |
| ***B29K 105/00*** | (2006.01) |
| ***C08J 5/18*** | (2006.01) |

(52) U.S. Cl.

CPC ........ *C08L 23/0815* (2013.01); *B29C 48/022* (2019.02); *B29C 48/10* (2019.02); *C08J 5/18* (2013.01); *B29K 2023/0625* (2013.01); *B29K 2067/00* (2013.01); *B29K 2077/00* (2013.01); *B29K 2085/00* (2013.01); *B29K 2105/0088* (2013.01); *B29K 2995/0012* (2013.01); *B29K 2995/0088* (2013.01); *B29K 2995/0094* (2013.01); *C08J 2323/08* (2013.01); *C08J 2477/04* (2013.01); *C08J 2485/02* (2013.01); *C08L 2203/16* (2013.01); *C08L 2205/03* (2013.01); *C08L 2205/06* (2013.01); *C08L 2310/00* (2013.01)

(58) Field of Classification Search

CPC .............................. C08J 2485/02; C08L 23/08

See application file for complete search history.

(56) References Cited

U.S. PATENT DOCUMENTS

| | | | |
|---|---|---|---|
| 3,222,314 A | 12/1965 | Wolinski | |
| 4,013,622 A | 3/1977 | DeJuneas et al. | |
| 4,327,009 A | 4/1982 | Allen et al. | |
| 4,415,691 A | 11/1983 | Allen et al. | |
| 4,540,538 A | 9/1985 | Corwin et al. | |
| 4,855,360 A | 8/1989 | Duchesne et al. | |
| 5,015,693 A | 5/1991 | Duchesne et al. | |
| 5,550,193 A | 8/1996 | Chiu et al. | |
| 6,124,428 A | 9/2000 | Schmieg et al. | |
| 6,294,604 B1 | 9/2001 | Focquet et al. | |
| 7,041,742 B2 | 5/2006 | Panek et al. | |
| 7,442,742 B1 | 10/2008 | Smink et al. | |
| 7,528,185 B2 | 5/2009 | Lee | |
| 8,178,479 B2 | 5/2012 | Cernohous | |
| 8,388,868 B2 | 3/2013 | Easter | |
| 8,455,580 B2 | 6/2013 | Sengupta et al. | |
| 8,552,136 B2 | 10/2013 | Papp et al. | |
| 8,563,637 B2 * | 10/2013 | Jakupca | C08K 5/524 558/158 |
| 8,728,370 B2 | 5/2014 | Vogt et al. | |
| 9,115,274 B2 | 8/2015 | Bates | |
| 9,187,629 B2 | 11/2015 | Adamczyk et al. | |
| 9,630,349 B2 | 4/2017 | Chatterjee et al. | |
| 9,896,575 B2 | 2/2018 | Duchesne et al. | |
| 9,920,285 B2 | 3/2018 | Wakita | |
| 10,030,108 B1 | 7/2018 | Lau et al. | |
| 10,242,769 B2 | 3/2019 | Kohri et al. | |
| 10,358,506 B2 | 7/2019 | Ding et al. | |
| 10,544,293 B2 | 1/2020 | Kohri et al. | |
| 10,982,079 B2 | 4/2021 | Claude et al. | |

(Continued)

FOREIGN PATENT DOCUMENTS

| | | |
|---|---|---|
| CA | 641321 A | 5/1962 |
| CA | 2264463 A1 | 9/2000 |

(Continued)

OTHER PUBLICATIONS

Akers, M. J. et al., (2002) "Formulation Development of Protein Dosage Forms", Development and Manufacture of Protein Pharmaceuticals, pp. 47-75.

Schiweck, H. et al., (Jan. 15, 2012) "Sugar Alcohols", Ullman's Encyclopedia of Industrial Chemistry, pp. 1-37.

Benson, F.R. in M. Schick (ed.): Nonionic Surfactants, Marcel Dekker, New York 1967, p. 247.

International Search Report and Written Opinion for International Patent Application No. PCT/US2025/043476 dated Dec. 2, 2025. PDF file. 11 pages.

*Primary Examiner* — Ana L. Woodward

(74) *Attorney, Agent, or Firm* — C. Tumey Law Group PLLC

(57) ABSTRACT

Methods and compositions for processing polymers with fluorine-free polymer processing aids (PPAs) are described. The methods can include extruding a polymer composition, optionally with a masterbatch, wherein the polymer composition and/or the masterbatch comprises a fluorine-free PPA to make a polymeric film. The PPA comprises a mixture of one or more polyamides and one or more polyphosphites.

16 Claims, 1 Drawing Sheet

(56) References Cited

U.S. PATENT DOCUMENTS

| | | | |
|---|---|---|---|
| 11,472,928 | B2 | 10/2022 | Jakupca et al. |
| 11,643,534 | B2 | 5/2023 | Ruocco et al. |
| 11,746,219 | B2 | 9/2023 | Canright et al. |
| 12,018,142 | B2 | 6/2024 | Leaf et al. |
| 2003/0040695 | A1 | 2/2003 | Zhao et al. |
| 2004/0024138 | A1 | 2/2004 | Allermann |
| 2005/0070644 | A1 | 3/2005 | Tikuisis et al. |
| 2006/0217490 | A1 | 9/2006 | Lee et al. |
| 2007/0087118 | A1 | 4/2007 | Tang et al. |
| 2008/0132654 | A1 | 6/2008 | Ho et al. |
| 2008/0318065 | A1 | 12/2008 | Sherman et al. |
| 2009/0043012 | A1 | 2/2009 | Easter |
| 2010/0216923 | A1 | 8/2010 | Stevenson et al. |
| 2012/0059102 | A1 | 3/2012 | Cernohous et al. |
| 2013/0068498 | A1 | 3/2013 | Adamczyk et al. |
| 2013/0244522 | A1 | 9/2013 | Knack |
| 2014/0182882 | A1 | 7/2014 | Adamczyk et al. |
| 2014/0242314 | A1 | 8/2014 | Inn et al. |
| 2015/0175785 | A1 | 6/2015 | Lavallee et al. |
| 2015/0315401 | A1 | 11/2015 | Lee |
| 2016/0145427 | A1 | 5/2016 | Eng et al. |
| 2016/0229994 | A1 | 8/2016 | Claude et al. |
| 2017/0342245 | A1 | 11/2017 | Lavallee et al. |
| 2020/0308379 | A1 | 10/2020 | Rousseaux et al. |
| 2020/0325314 | A1 | 10/2020 | Bergqvist et al. |
| 2022/0112363 | A1 | 4/2022 | Hamad et al. |
| 2023/0036922 | A1 | 2/2023 | Leaf et al. |
| 2023/0202089 | A1 | 6/2023 | Wasylenko et al. |
| 2023/0265269 | A1 | 8/2023 | Saba et al. |
| 2023/0399426 | A1 | 12/2023 | Li et al. |
| 2024/0140012 | A1 | 5/2024 | Taylor et al. |
| 2024/0218129 | A1 * | 7/2024 | Taylor ...................... C08K 3/22 |
| 2024/0392121 | A1 | 11/2024 | Van Hoyweghen et al. |
| 2025/0034376 | A1 | 1/2025 | Longanecker et al. |

FOREIGN PATENT DOCUMENTS

| | | | |
|---|---|---|---|
| CA | 3176575 | A1 | 11/2021 |
| CN | 103819782 | A | 5/2014 |
| CN | 102746563 | B | 6/2014 |
| CN | 104277300 | A | 1/2015 |
| CN | 104403170 | A | 3/2015 |
| CN | 103772789 | B | 4/2016 |
| CN | 105542303 | A | 5/2016 |
| CN | 104558751 | B | 6/2017 |
| CN | 107312231 | A | 11/2017 |
| CN | 107540920 | A | 1/2018 |
| CN | 107955244 | A | 4/2018 |
| CN | 109535541 | A | 3/2019 |
| CN | 110317383 | A | 10/2019 |
| CN | 107540920 | B | 12/2019 |
| CN | 108481855 | B | 7/2020 |
| CN | 112029173 | A | 12/2020 |
| CN | 108503937 | B | 4/2021 |
| CN | 110105627 | B | 4/2021 |
| CN | 111849050 | B | 5/2022 |
| CN | 112029173 | B | 8/2023 |
| CN | 118019789 | A | 5/2024 |
| CN | 118019793 | A | 5/2024 |
| CN | 118019795 | A | 5/2024 |
| CN | 118019797 | A | 5/2024 |
| EP | 0217585 | A2 | 4/1987 |
| EP | 0308090 | A2 | 3/1989 |
| EP | 0524404 | A1 | 1/1993 |
| EP | 1160278 | A1 | 12/2001 |
| EP | 0859025 | B1 | 3/2003 |
| EP | 1839851 | A2 | 10/2007 |
| EP | 2473265 | A1 | 7/2012 |
| EP | 3234004 | B1 | 7/2020 |
| EP | 3908627 | A1 | 11/2021 |
| EP | 4408920 | A2 | 8/2024 |
| EP | 4408921 | A1 | 8/2024 |
| EP | 4408924 | A1 | 8/2024 |
| JP | 2011-032399 | A | 2/2011 |
| JP | 2012-009754 | A | 1/2012 |
| JP | 55-25932 | B2 | 6/2014 |
| KR | 10-2020-0053903 | A | 5/2020 |
| KR | 10-2167728 | B1 | 10/2020 |
| WO | 1998010928 | A1 | 3/1998 |
| WO | 2005054315 | A1 | 6/2005 |
| WO | 2011028206 | A1 | 3/2011 |
| WO | 2012123357 | A1 | 9/2012 |
| WO | 2013023247 | A1 | 2/2013 |
| WO | 2017077455 | A2 | 5/2017 |
| WO | 2020100001 | A1 | 5/2020 |
| WO | 2020146351 | A1 | 7/2020 |
| WO | 2021220134 | A1 | 11/2021 |
| WO | 2022076296 | A1 | 4/2022 |
| WO | 2022079601 | A1 | 4/2022 |
| WO | 2022120321 | A1 | 6/2022 |
| WO | 2023285888 | A1 | 1/2023 |
| WO | 2023056213 | A1 | 4/2023 |
| WO | 2023056250 | A1 | 4/2023 |
| WO | 2023149984 | A1 | 8/2023 |
| WO | 2023149985 | A1 | 8/2023 |
| WO | 2023154744 | A1 | 8/2023 |
| WO | WO2025/068546 | | 4/2025 |

* cited by examiner

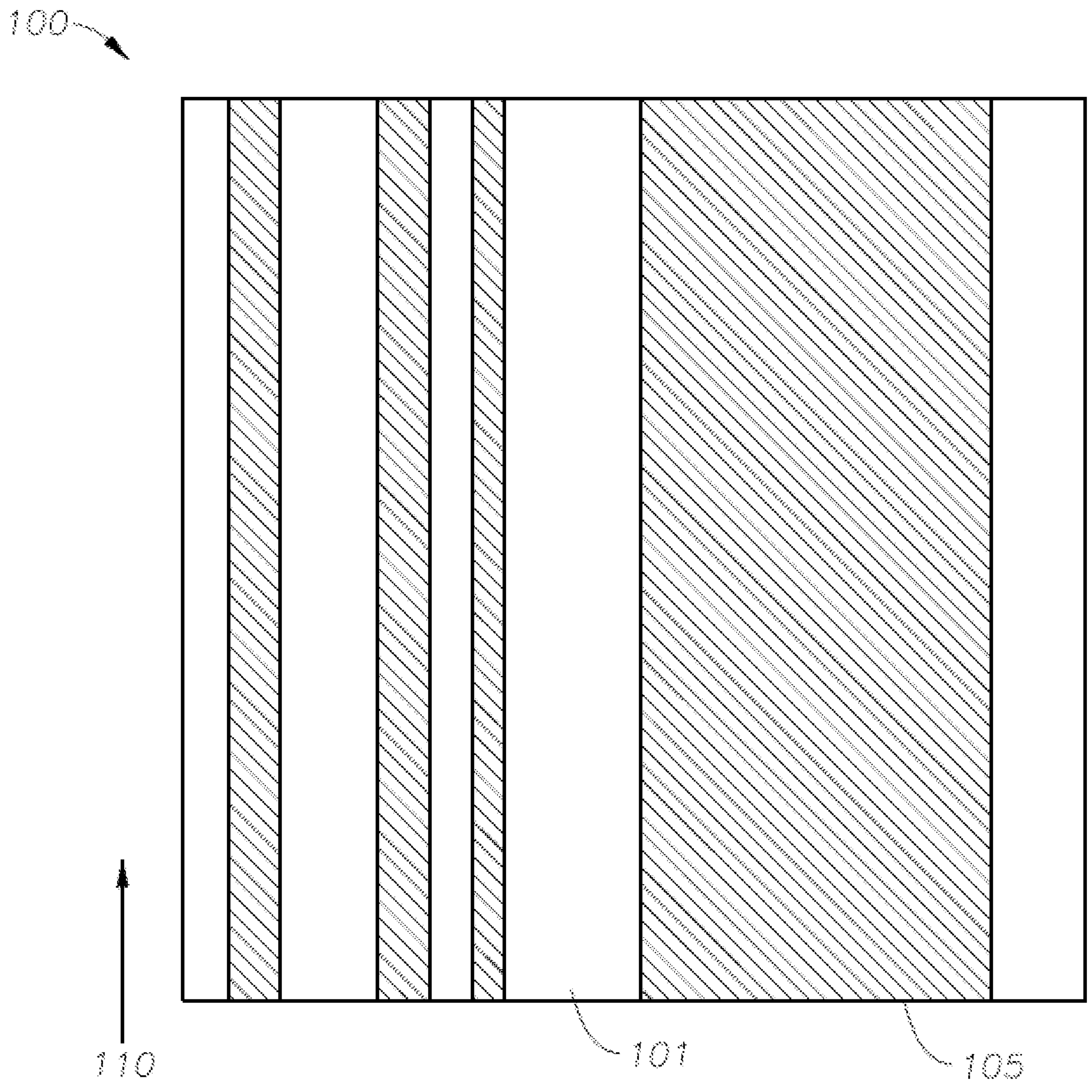
100
110
101
105

POLYMER PROCESSING AIDS

CROSS-REFERENCE TO RELATED APPLICATION

This application claims the benefit of U.S. Provisional Application 63/712,136, filed Oct. 25, 2024, entitled "Polymer Processing Aids", the entirety of which is incorporated by reference herein.

FIELD OF THE INVENTION

The present disclosure relates to additives for polyolefin polymers (such as polyethylene), as well as the polymers themselves, methods of making them, and articles made therefrom.

BACKGROUND OF THE INVENTION

Polyolefin polymer compositions are in high demand for many applications, including various films (such as cast films, shrink films, and blown films), sheets, membranes such as geomembranes, sacks, pipes (e.g., polyethylene of raised temperature (PE-RT) pipes, utility pipes, and gas distribution pipes), roto-molded parts, blow-molded flexible bottles or other containers, and various other blow molded/extruded articles such as bottles, drums, jars, and other containers. These applications have been commonly made from, for example, polyethylene polymers.

In polyethylene (PE) extrusion, melt fracture and die lip buildup are two significant issues that can impact the quality of the extruded film and the overall efficiency of the production process. Melt fracture occurs when the polymer melt experiences high shear stress as it exits the die. The combined effects of high extrusion speeds, high extruder pressure, and/or polymer melt temperature for particular polymers can lead to surface irregularities on the film caused by a conflict between the polymer viscosity and the extrusion rate. These irregularities can manifest as rough textures, commonly known as "sharkskin," or more severe surface distortions called "gross melt fracture."

The negative impacts of melt fracture are evident in the compromised surface quality of the film. A rough or uneven surface can affect both the aesthetic and functional properties of the film, particularly its optical clarity and mechanical strength. Additionally, melt fracture often results in higher levels of waste, as defective material must be discarded, which reduces production efficiency.

Die lip buildup is the accumulation of degraded polymer, additives, and/or other materials on the lips of the extrusion die. Over time, this buildup occurs as the polymer passes through the die, leading to uneven flow and surface defects on the extruded film. Polymer degradation due to prolonged exposure to heat can result in the formation of residues that adhere to the die lips. Additives, such as slip agents, pigments, or stabilizers, may also accumulate if they are not fully incorporated into the polymer melt. Irregular flow dynamics further contribute to the buildup problem, causing some material to stick to the die lips.

The negative effects of die lip buildup include surface defects like streaks, lines, or rough patches on the film, as well as inconsistencies in film thickness. Buildup also leads to increased downtime, as the extrusion line may need to be stopped frequently for cleaning and maintenance.

Polyolefin polymers are most commonly produced and sold as pellets, formed in post-polymerization reactor finishing processes (such as extrusion of polymer product that is in an at least partially molten state, followed by pelletization). Additives are commonly blended into the polymer product as part of this finishing process, such that the polymer pellets comprise the polymer itself and one or more additives.

Common additives, particularly for polymers such as polyethylenes intended for use as films, sacks, and other similar articles, include polymer processing aids (PPAs), which help make the pellets easier to manipulate in downstream manufacturing processes (such as extrusion, rolling, blowing, casting, and the like). Both melt fracture and die lip buildup can adversely affect film properties, distort clarity, and reduce gauge uniformity. Thus, certain polymer grades susceptible melt fracture and/or die lip build up often rely on a PPA to mitigate these issues. Adequate amounts of PPA, among other things, help eliminate melt fractures and/or die lip buildup in films made from the polymer pellets. This is particularly so for polymer pellets exhibiting relatively higher viscosity in extrusion processes.

The most common PPAs are or include fluoropolymers (fluorine-containing polymers). It is, however, desired to find alternative PPAs that do not include fluoropolymers and/or fluorine, while maintaining the effectiveness of fluoropolymer-based PPAs in preventing melt fractures and/or die lip buildup.

Some references of potential interest in this regard include: U.S. Pat. Nos. 11,472,928; 10,982,079; 10,242,769; 10,544,293; 9,896,575; 9,630,349; 9,187,629; 9,115,274; 8,563,637; 8,552,136; 8,455,580; 8,728,370; 8,388,868; 8,178,479; 7,528,185; 7,442,742; 6,294,604; 5,015,693; 4,855,360; and 4,540,538; U.S. Patent Publication Nos. 2020/0325314, 2017/0342245, 2016/0229994, 2015/0175785, 2016/0145427, 2014/0242314, 2014/0182882, 2008/0132654, 2005/0070644, and 2003/0040695, as well as WO2023/241955A1, WO2023/238032, WO2020/146351, WO2017/077455, WO2011/028206, CN112029173, CN110317383, CN108481855, CN104558751, KR10-2020-0053903, JP2012009754A, CN103772789, CN107540920, CN11010562730B, CN10850393713B, CN11184905030A, CN10274656304B, and WO2020/100001A1.

SUMMARY OF THE INVENTION

The present disclosure relates to polymer compositions, their methods of manufacture, and articles including and/or made from the polymer compositions. In a particular focus, the polymer compositions may be polyolefin compositions. In some embodiments, the polyolefin compositions are polyethylene compositions. It has been discovered that a combination of a polyamide (PA) and a polyphosphite (PPI) can be an advantageous replacement of fluorine-based PPAs in polyolefin compositions.

In some embodiments, a polymer composition is provided wherein the polymer composition comprising a $C_2$-$C_6$ olefin homopolymer or a copolymer of two or more $C_2$-$C_{20}$ α-olefins and a polymer processing aid. The polymer processing aid comprises a mixture of one or more polyamides and one or more polyphosphites. The mixture is present in the polymer composition in an amount in the range of from 560 ppm to 4,400 ppm, from 680 ppm to 4,200 ppm, from 800 ppm to 4,000 ppm, from 920 ppm to 3,800 ppm, from 1,040 ppm to 3,600 ppm, from 1,160 ppm to 3,400 ppm, from 1,280 ppm to 3,200 ppm, from 1,400 ppm to 3,000 ppm, from 1,520 ppm to 2,800 ppm, or from 1,640 ppm to 2,600 ppm. The PPA is free of or substantially free of fluorine; and, accordingly, the polymer compositions can be free of or substantially free of fluorine. In some embodiments, the mixture of the one or more PAs and the one or more PPIs is present in the polymer processing aid in an amount greater than or equal to 80 wt %, based on the weight of the polymer processing aid.

In some embodiments, a blown film is provided wherein the blown film is made from a polymer composition comprising a $C_2$-$C_6$ olefin homopolymer or a copolymer of two or more $C_2$-$C_{20}$ α-olefins and a polymer processing aid, wherein the film, when compared to a benchmark film, has:

i. a 1% secant modulus (MD) within ±15%, within ±10%, or within ±5% of the value (psi) of the benchmark film;
ii. a dart drop within ±15%, within ±10%, or within ±5% of the value (g) of the benchmark film;
iii. an Elmendorf tear (MD) within ±20%, within ±15%, or within ±10% of the value (g/mil) benchmark film;
iv. a MD gloss 45° within ±15 GU, within ±10 GU, or within ±5 GU of the value (in GU) of the benchmark film, and/or MD gloss 45° greater than or equal to 40 GU or greater than or equal to 43 GU;
v. a total haze within ±15% haze, within ±10% haze, or within ±5% haze of the value (in % haze) of the benchmark film, and/or total haze less than or equal to 20% or less than or equal to 16%; or
vi. a combination thereof;

wherein the benchmark film is made using a fluoropolymer-based polymer processing aid instead of the polymer processing aid comprising the mixture of one or more polyamides and one or more polyphosphites but is otherwise identical to the film.

In some embodiments, a method is provided wherein the method comprises blending a polyamide (PA)/polyphosphite (PPI) masterbatch with a polymer composition to obtain a polymer compound. The method further comprises forming the polymer compound into a polymer product. The PA/PPI masterbatch comprises a mixture of one or more PAs and one of more PPIs and a carrier resin. The polymer compound comprises the mixture of one or more PAs and one or more PPIs in an amount in the range of from 560 ppm to 4,400 ppm, from 680 ppm to 4,200 ppm, from 800 ppm to 4,000 ppm, from 920 ppm to 3,800 ppm, from 1,040 ppm to 3,600 ppm, from 1,160 ppm to 3,400 ppm, from 1,280 ppm to 3,200 ppm, from 1,400 ppm to 3,000 ppm, from 1,520 ppm to 2,800 ppm, or from 1,640 ppm to 2,600 ppm. The polymer compound is substantially free of fluorine-containing compounds. 20)

In some embodiments, a PPA masterbatch is provided wherein the PPA masterbatch comprises from 1 to 50 wt % of the mixture of one or more polyamides and one or more polyphosphites, based on the weight of the PPA masterbatch, a polyethylene carrier resin, and optionally, one or more non-PPA additives. Each of the one or more polyamides has: a) a low load melt index (LLMI) according to ASTM D-1238, 2.16 kg at 230° C. in the range of from 30 dg/min to 50 dg/min; b) a medium load melt index (MLMI) according to ASTM D-1238, 5 kg at 230° C. in the range of from 110 dg/min to 160 dg/min; or c) a combination thereof. Each of the one or more polyphosphites has: a) a number-average molecular weight ($M_n$) in the range of from 2,000 to 4,000 g/mol; b) a weight-average molecular weight ($M_w$) in the range of from 3,500 to 6,000 g/mol; c) a melting point in the range of from 85° C. to 100° C.; or d) a combination thereof. The masterbatch is free of or substantially free of fluorine-containing compounds.

In some embodiments, a process for making a polymeric film is provided wherein the process comprises, for a first time interval, continuously extruding a polymer composition through an extruder at extrusion conditions to form the polymeric film. The process further comprises, at a first time endpoint during the continuous extrusion, developing one or more melt fractures in the polymeric film. In response to developing the one or more melt fractures in the film, a PPA masterbatch is continuously fed to the extruder during a second time interval after the first time interval. A polymeric film is then obtained during at least the second time interval. The PPA masterbatch comprises: (i) from 1 to 50 wt % of a mixture of one or more polyamides (PAs) and one or more polyphosphites (PPIs), based on the weight of the masterbatch; (ii) a carrier resin; and (iii) optionally, one or more non-PPA additives. No PPA additives other than the mixture of one or more PAs and one or more PPIs are introduced to the extruder during the extruding. The polymeric film is substantially free of fluorine and fluorine-containing compounds.

The foregoing has outlined rather broadly the features and technical advantages of the present invention in order that the detailed description of the invention that follows may be better understood. Additional features and advantages of the invention will be described hereinafter, which form the subject matter of the claims of the invention. It should be appreciated by those skilled in the art that the conception and specific embodiments disclosed may be readily utilized as a basis for modifying or designing other film compositions and/or processes for carrying out the same purposes of the present invention. It should also be realized by those skilled in the art that such equivalent constructions do not depart from the spirit and scope of the invention as set forth in the appended claims. The novel features which are believed to be characteristic of the invention, both as to its structure and method of manufacture, together with further objects and advantages will be better understood from the following description.

BRIEF DESCRIPTION OF THE DRAWINGS

FIG. 1 is a schematic conceptually illustrating streaks of melt fractures and stripes of regions with melt fractures eliminated in a blown film during extrusion.

DETAILED DESCRIPTION OF THE INVENTION

Illustrative embodiments of the subject matter claimed below will now be disclosed. In the interest of clarity, some features of some actual implementations may not be described in this specification. It will be appreciated that in the development of any such actual embodiments, numerous implementation-specific decisions must be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase. It must also be noted that, as used in the specification and the appended claims, the singular forms "a," "an," and "the" include plural references unless otherwise specified.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

Definitions

As used herein, "a" or "an" when used in conjunction with the term "comprising" in the claims or the specification means one or more than one, unless the context dictates otherwise.

As used herein, "about" means the stated value plus or minus the margin of error of measurement or plus or minus 10% if no process of measurement is indicated.

As used herein, "alpha-olefin" or "α-olefin" refers to an olefin having a terminal carbon-to-carbon double bond in the structure thereof $R^1R^2C{=}CH_2$, where $R^1$ and $R^2$ can be independently hydrogen or any hydrocarbyl group; such as $R^1$ is hydrogen and $R^2$ is an alkyl group. A "linear alpha-olefin" is an alpha-olefin wherein $R^1$ is hydrogen and $R^2$ is hydrogen or a linear alkyl group. For the purposes of the present disclosure, ethylene shall be considered an α-olefin.

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of" "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of."

As used herein, "consisting essentially of" excludes additional material elements, but allows the inclusions of non-material elements that do not substantially change the nature of the invention.

As used herein, "consisting of" is closed and excludes all additional elements.

As used herein, "extruding" and grammatical variations thereof refer to processes that include forming a polymer and/or polymer blend into a melt, such as by heating and/or sheer forces, and then forcing the melt out of a die in a form or shape such as in a film, or in strands that are pelletized. Most any type of apparatus will be appropriate to effect extrusion such as a single or twin-screw extruder, or other melt-blending device as is known in the art and that can be fitted with a suitable die. It will also be appreciated that extrusion can take place as part of a polymerization process (in particular, in the finishing portion of such process) as part of forming polymer product (such as polymer pellets); or it can take place as part of the process for forming articles such as films from the polymer pellets (e.g., by at least partially melting the pellets and extruding through a die to form a sheet, especially when combined with blowing air such as in a blown film formation process). In the context of the present disclosure, extrusion in the finishing portion of polymerization processes may be referred to as compounding extrusion, and typically involves feeding additives plus additive-free (reactor grade) polymer to the extruder to form finished polymer product such as polymer pellets; while extrusion of polymer to make articles (e.g., extrusion of polymer pellets to make films) takes place conceptually "downstream" (e.g., at a later point, after polymer product has been formed including through compounding extrusion), and typically involves feeding optional additives plus additive-containing polymer to the extruder to form a polymeric article such as a film.

As used herein, "finishing" as used herein with reference to a polymerization process refers to post-polymerization reactor processing steps taken to form a finished polymer product, such as polymer pellets, with one example of a finishing process being the compounding extrusion just discussed. As the ordinarily skilled artisan will recognize, finishing is distinguished from, and conceptually takes place antecedent to, further processing of the finished polymer product into articles such as films.

As used herein, "olefin," alternatively referred to as "alkene," means a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 50 wt % to 55 wt %, it is understood that the mer unit in the copolymer is derived from ethylene in the polymerization reaction and said derived units are present at 50 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. Accordingly, the definition of copolymer, as used herein, includes terpolymers and the like. "Different" as used to refer to mer units indicates that the mer units differ from each other by at least one atom or are different isomerically.

As used herein, "organic phosphites" are phosphorous-containing compounds where the phosphorus atom is bonded to carbon atoms through oxygen linkages in organic groups, such as but not limited to alkyl and/or aryl groups.

As used herein, "PA/PPI-based PPA composition" is a polymer processing aid composition containing a polyamide and a polyphosphite.

As used herein, "polyethylene" refers to a polymer having at least 50 wt % ethylene-derived units, such as at least 70 wt % ethylene-derived units, such as at least 80 wt % ethylene-derived units, such as at least 90 wt % ethylene-derived units, or at least 95 wt % ethylene-derived units, or 100 wt % ethylene-derived units. The polyethylene can thus be a homopolymer or a copolymer, including a terpolymer, having one or more other monomeric units. A polyethylene described herein can, for example, include at least one or more other olefin(s) and/or comonomer(s).

As used herein, "ppm" means parts per million on a weight basis unless otherwise indicated.

As used herein, "ppt" means parts per thousand on a weight basis unless otherwise indicated.

As used herein, "substantially free" permits trace amounts (e.g., 10 ppm or less, 1 ppm or less, or 0.1 ppm or less) of an impurity (e.g., fluorine), but well below the amount that would intentionally be included in a polymer composition (e.g., in the case of fluorine, about 100 ppm of fluorine atoms by mass of polymer product in a typical case where such additives are included).

As used herein, "wt %" means weight percent.

Polymers

In various embodiments, polymer compositions include one or more polymers. In some embodiments, one or more polymers comprise polyolefin polymers. Examples include homopolymers (e.g., homopolymers of a $C_2$ to $C_{10}$ α-olefin or a $C_2$ to $C_6$ α-olefin). Particular examples of homopolymers include homopolyethylene and polypropylene (hPP), with homopolyethylene preferred in the present disclosure. Homopolyethylene may be produced, e.g., by free radical polymerization in a high-pressure process, resulting typically in a highly branched ethylene homopolymer-often known as LDPE (low density polyethylene), having density less than 0.945 g/cm$^3$, often 0.935 g/cm$^3$ or less, such as within the range from 0.900, 0.905, or 0.910 g/cm$^3$ to 0.920, 0.925, 0.927, 0.930, 0.935, or 0.945 g/cm$^3$. Unless otherwise noted herein, all polymer density values are determined per ASTM D1505. Samples are molded under ASTM D4703-10a, procedure C, and conditioned under ASTM D618-08 (23°±2° C. and 50±10% relative humidity) for 40 hours before testing.

In another example, ethylene monomers may be polymerized via known gas, slurry, and/or solution phase polymerization (e.g., using catalysts such as chromium-based catalysts, or single-site catalysts such as Ziegler-Natta and/or metallocene catalysts, all of which are well known in the art of polymerization and not discussed further herein. Where a more highly linear ethylene homopolymer is produced (e.g., using gas or slurry phase polymerization with any of the above noted catalysts), it may be referred to as HDPE (high density polyethylene), typically having density 0.945 g/cm$^3$ or greater, such as within the range from 0.945 to 0.970 g/cm$^3$.

Yet further polymer examples include copolymers of two or more $C_2$ to $C_{40}$ α-olefins, such as $C_2$ to $C_{20}$ α-olefins, such as ethylene-α-olefin copolymers, or propylene-α-olefin copolymers (e.g., propylene-ethylene copolymers, or propylene-ethylene-diene terpolymers, sometimes known as EPDMs or PEDMs). Particular examples contemplated herein include copolymers of ethylene and one or more $C_3$ to $C_{20}$ α-olefin comonomers, such as $C_4$ to $C_{12}$ α-olefin comonomers. In some embodiments, α-olefin comonomers are selected from 1-butene, 1-hexene, 1-octene, or combinations thereof. An ethylene copolymer (e.g., a copolymer of ethylene and one or more $C_3$ to $C_{20}$ α-olefins) can include ethylene-derived units in an amount of at least 80 wt %, or 85 wt %, such as at least 90, 93, 94, 95, or 96 wt % (for instance, in a range from a low of 80, 85, 90, 91, 92, 93, 94, 95, 96, or 97 wt %, to a high of 94, 95, 95.5, 96, 96.5, 97, 97.5, or 98 wt %, with ranges from any foregoing low value to any foregoing high value contemplated (provided the high is greater than the low) based on a total amount of ethylene-derived units and comonomer-derived units. For instance, the ethylene copolymer can include 88, 90, 92, 94 or 95 wt % to 97 or 98 wt % ethylene-derived units based on the total amount of ethylene-derived units and comonomer-derived units. The balance of the copolymer (on the basis of ethylene-derived units and comonomer-derived units) is comprised of the comonomer-derived units. For example, comonomer units (e.g., $C_2$ to $C_{20}$ α-olefin-derived units, such as units derived from butene, hexene, and/or octene) may be present in the ethylene copolymer from a low of 2, 2.5, 3, 3.5, 4, 4.5, 5, or 6 wt %, to a high of 3, 4, 5, 6, 7, 8, 9, 10, 15, or 20 wt %, with ranges from any foregoing low to any foregoing high contemplated (provided the high is greater than the low value).

For ethylene-based, propylene-based, or other α-olefin based copolymers, several suitable comonomers were already noted, although in various embodiments, other α-olefin comonomers are contemplated. For example, the α-olefin comonomer can be linear or branched, and two or more comonomers can be used, if desired. Examples of suitable comonomers include linear $C_3$-$C_{20}$ α-olefins (such as butene, hexene, octene as already noted), and α-olefins having one or more $C_1$-$C_3$ alkyl branches, or an aryl group. Examples can include propylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. In some embodiments, comonomers include propylene, 1-butene, 1-pentene, 4-methyl-1-pentene, 1-hexene, 1-octene and styrene.

In particular embodiments, the polymer can comprise or can be an ethylene copolymer (per those described above). The ethylene copolymer can be produced in gas, slurry, or solution phase polymerization. In some embodiments, ethylene copolymers can be produced in gas or slurry phase polymerization. In some embodiments, ethylene copolymers are produced gas phase polymerization, as in a gas phase fluidized bed polymerization reactor. A particular example is a linear-low density polyethylene (LLDPE), a copolymer of ethylene and one or more α-olefins polymerized in the presence of one or more single-site catalysts, such as one or more Ziegler-Natta catalysts, one or more metallocene catalysts, and combinations thereof. Such LLDPE can have density within the range from a low of 0.900, 0.905, 0.907, 0.910 g/cm$^3$ to a high of 0.920, 0.925, 0.930, 0.935, 0.940, or 0.945 g/cm$^3$. LLDPE can be distinguished from the above-mentioned LDPE in several respects, many of which are well known in the art, including the degree of branching (sometimes referred to more specifically as long-chain branching) in the produced polymer, noting that LLDPE has substantially less (often little, if any) long chain branching. In some embodiments, the polymer of the polymer composition is or includes a metallocene-catalyzed LLDPE (mLLDPE).

mLLDPE as compared to Ziegler-Natta-catalyzed LLDPE can have one or both of the following distinguishing properties: (1) narrower molecular weight distribution (e.g., $M_w/M_n$ of 5.0 or less, such as 4.5 or less, or 3.5 or less, or 3.0 or less, or within the range of from a low of 1, 1.5, 2, or 2.5 to a high of 2.5, 3, 3.5, 4.0, 4.5, or 5.0 with ranges from any foregoing low end to any foregoing high end contemplated, provided the high end is greater than the low end); and/or (2) orthogonal composition distribution. The latter term refers to comonomer incorporation on individual chains of the polymer. In Ziegler-Natta catalyzed polymers such as ethylene copolymers, having a "conventional" composition distribution, comonomer is preferentially incorporated into smaller (i.e., shorter or lower-molecular-weight) polymer chains, while larger (longer or higher-molecular weight) polymer chains have relatively less comonomer. On the other hand, an "orthogonal" composition distribution, and in particular a broad orthogonal composition distribution (BOCD) is known to result from certain metallocene catalysts or catalyst systems, wherein the reverse is the case: more comonomer is incorporated on longer polymer chains, while shorter chains have relatively less comonomer. This can particularly be the case when carrying out polymerization with mixed or multiple catalyst systems (e.g., two or more metallocene catalysts), wherein mLLDPE is obtained that has relatively broad MWD (like Ziegler-Natta catalyzed LLDPE), but also having BOCD (the reverse of Ziegler-Natta catalyzed LLDPE). In this regard, see paragraphs 0045-0046, 51, and 53 of U.S. patent application Ser. No. 17/661,958, entitled "Blends of Recycled Resins with Metallocene-catalyzed Polyolefins" and filed May 4, 2022, which description is incorporated herein by reference. In particular, such polymers may be 2.5 copolymers of ethylene and a $C_3$ to $C_{20}$ $\alpha$-olefin, such as a $C_3$ to $C_{12}$ $\alpha$-olefin such as 1-butene, 1-hexene, and/or 1-octene, having 80 to 99 wt % units derived from ethylene and the balance derived from the $\alpha$-olefin comonomer(s). Any of various property quantifications can be associated with a BOCD nature, such as one or more of: (i) $T_{75}$-$T_{25}$ value from 5 to 10 (where $T_{25}$ is the temperature in degrees Celsius at which 25% of the eluted polymer is obtained and $T_{75}$ is the temperature in degrees Celsius at which 75% of the eluted polymer is obtained via temperature rising elution fractionation (TREF)); (ii) a composition distribution breadth index (CDBI) less than about 40%, such as less than about 35%; and (iii) a first peak and a second peak in a comonomer distribution analysis, wherein the first peak has a maximum at a log(MW) value of from 4.0 to 5.4 and a TREF elution temperature from 70° C. to 100° C., and the second peak has a maximum at a log(MW) value of 5.0 to 6.0 and a TREF elution temperature of 40° C. to 60° C. Paragraphs 37 and 44 of U.S. patent application Ser. No. 17/661,958 describe the CDBI and TREF methods for determining these properties. Also or instead, a copolymer can be determined to have BOCD nature through the methods described in paragraphs [0048]-[0054] and FIG. 2a of WO2022/120321, which description is incorporated herein by reference, especially regarding the description of FIG. 2a and the use of a gas phase chromatography (GPC)-derived plot of comonomer wt % vs. log(MW) to illustrate BOCD when such a plot exhibits positive slope, as quantified through the Comonomer Slope Index values described in the incorporated passages of WO2022/120321. Either or both of the above-noted distinctions (1) and (2) are noted to recognize that some metallocene-catalyzed LLDPE (mLLDPE) can be catalyzed using multiple metallocene catalysts in order to obtain broader $M_w/M_n$, akin to (or even higher than) that of ZN-LLDPE. In some embodiments; such catalyst systems would then result in BOCD in the mLLDPE, thus even broad $M_w/M_n$ LLDPE can be considered mLLDPE where it exhibits BOCD.

In some embodiments, all or substantially all (99.9 wt % or more, such as 99.99 wt % or more, or 99.9999 wt % or more) polymer of the polymer composition (before a PA/PPI combination or PA/PPI masterbatch is provided thereto, as discussed in more detail below) comprises metallocene-catalyzed LLDPE, and particularly metallocene LLDPE produced in a gas phase polymerization reactor. Such polymers often impart superior strength properties such as impact resistance to films made therefrom, often at the cost of being harder to process (and therefore underscoring a greater need for polymer processing aids such as those of the present disclosure).

Density of the polymer may be within the range from 0.905 to 0.945 g/cm$^3$, such as within the range from a low of any one of 0.905, 0.907, 0.908, 0.910, 0.911, 0.912, 0.913, 0.914, or 0.915 g/cm$^3$ to a high of any one of 0.916, 0.917, 0.918, 0.919, 0.920, 0.924, 0.926, 0.930, 0.935, 0.940 or 0.945 g/cm$^3$, with ranges from any foregoing low to any foregoing high contemplated herein (e.g., 0.910 to 0.925 or 0.935 g/cm$^3$, such as 0.912 to 0.925, or 0.915 to 0.918 g/cm$^3$). Alternatively, the polymer may be of higher density (e.g., HDPE), having density within the range from 0.945 g/cm$^3$ to 0.970 g/cm$^3$.

Further, the rheology characteristics of the polymer may influence the preferred PA/PPI-based PPA composition to be employed in the polymer composition to form a finished polymer product. In general, a PPA composition is employed in a polymer having melt index (MI, or $I_2$, determined per ASTM D1238 at 190° C., 2.16 kg loading) of 5.0 g/10 min or less or 2.5 g/10 min or less, or in a range of from 0.1, 0.2, or 0.5 g/10 min to 1.0, 1.2, 1.5, 2.0, 2.5, 3.0, 4.0, or 5.0 g/10 min (with ranges from any low to any high contemplated).

Melt index ratio (MIR) is another polymer characteristic of potential interest in this regard. MIR is herein defined as the ratio of high load melt index (HLMI) (determined per ASTM D1238 at 190° C., 21.6 kg loading) to melt index, or HLMI/MI. Polymers of some embodiments can have MIR generally within the range from 10, 12, or 15 to 19, 20, 21, 22, 25, 27, 30, 35, 40, 45, 50, 60, 65, 70, 75, 80, 85, 90, 95, or 100. In particular embodiments, a PPA composition consisting or consisting essentially of a PA/PPI combination or PA/PPI masterbatch (discussed below) is employed for polymers (especially ethylene-based polymers, such as copolymers of ethylene and a $C_3$ to $C_{12}$ alpha-olefin) having MIR greater than 20, such as within the range from greater than 20, or from 21, 22, 23, 25, 27, or 30, to a high of 35, 40, 45, 50, 60, 65, 70, 75, 80, 85, 90, 95, or 100. Optionally, MI in such polymers can be less than 1.5 g/10 min, such as 1.0 g/10 min or less (e.g., within the range from 0.1, 0.2, or 0.5 g/10 min to 1.0; or to any one of 1.1, 1.2, 1.3, 1.4, or less than 1.5 g/10 min).

The PA/PPI-based polymer processing aids are discussed in more detail below.

Polyamide/Polyphosphite Polymer Processing Aid

The polymer compositions disclosed herein include a mixture of one or more polyamides and one or more polyphosphites as a polymer processing aid (PPA).

In some embodiments, the mixture of the one or more polyamides and the one or more polyphosphites is present in the polymer processing aid in an amount greater than or equal to 80 wt %, greater than or equal to 90 wt %, greater than or equal to 99 wt %, greater than or equal to 99.9 wt %, or greater than or equal to 99.99 wt %, based on the total mass of the PPA. In some embodiments, the PPA consists essentially of the PA/PPI mixture. In some embodiments, the PPA consists of the PA/PPI mixture.

In some embodiments, the PPA is added to a polymer in an amount effective to produce a polymer composition comprising the mixture of the one or more polyamides and the one or more polyphosphites in an amount greater than or equal to 560 ppm, greater than or equal to 680 ppm, greater than or equal to 800 ppm, greater than or equal to 920 ppm, greater than or equal to 1,040 ppm, greater than or equal to 1,160 ppm, greater than or equal to 1,280 ppm, greater than or equal to 1,400 ppm, greater than or equal to 1,520 ppm, or greater than or equal to 1,640 ppm.

In some embodiments, the PPA is added to a polymer in an amount effective to produce a polymer composition comprising the mixture of the one or more polyamides and the one or more polyphosphites in an amount less than or equal to 4,400 ppm, less than or equal to 4,200 ppm, less than or equal to 4,000 ppm, less than or equal to 3,800 ppm, less than or equal to 3,600 ppm, less than or equal to 3,400 ppm, less than or equal to 3,200 ppm, less than or equal to 3,000 ppm, less than or equal to 2,800 ppm, or less than or equal to 2,600 ppm.

In some embodiments, the PPA is added to a polymer in an amount effective to produce a polymer composition comprising the mixture of the one or more polyamides and the one or more polyphosphites in an amount in the range of from 560 ppm to 4,400 ppm, from 680 ppm to 4,200 ppm, from 800 ppm to 4,000 ppm, from 920 ppm to 3,800 ppm, from 1,040 ppm to 3,600 ppm, from 1,160 ppm to 3,400 ppm, from 1,280 ppm to 3,200 ppm, from 1,400 ppm to 3,000 ppm, from 1,520 ppm to 2,800 ppm, or from 1,640 ppm to 2,600 ppm.

In some embodiments, the mixture of the one or more polyamides and the one or more polyphosphites comprises the one or more polyamides and the one or more polyphosphites in a ratio of the weight of the one or more polyamides to weight of the one or more polyphosphites in the range of from 6:1 to 1:25, from 5:1 to 1:20, from 4:1 to 1:15, from 3:1 to 1:8, or from 2:1 to 1:3, based on the total weight of the one or more polyamides and the one or more polyphosphites.

Polyamides

In some embodiments, each one of the one or more polyamides comprises an aliphatic polyamide, an aromatic polyamide (aramid), a semi-aromatic polyamide, a high-performance polyamide, a bio-based polyamide, a polyamide copolymer, a thermoplastic elastomer polyamide, or a combination thereof.

Aliphatic polyamides are the most common and well-known type of polyamides, often referred to as nylons and are produced through the polycondensation of diamines and dicarboxylic acids or by ring-opening polymerization of lactams. In some embodiments, the aliphatic polyamide (nylon) comprises nylon 6, nylon 6,6, nylon 12, or a combination thereof.

Aramids are a type of polyamide that contains aromatic (benzene ring) structures in their backbone. They are known for their exceptional strength, heat resistance, and chemical stability. In some embodiments, the aromatic polyamide (aramid) comprises Kevlar™ material (available from DuPont), Nomex™ material (available from DuPont), or a combination thereof.

Semi-aromatic polyamides, also known as polyphthalamides (PPA), have both aliphatic and aromatic components in their molecular structure. They combine some of the benefits of both aliphatic and aromatic polyamides, such as high temperature and chemical resistance. In some embodiments, the semi-aromatic polyamide comprises nylon 6T, nylon 6I, nylon MXD6, or a combination thereof.

High performance polyamides are engineered for use in extreme conditions, with high resistance to heat, wear, and chemicals. In some embodiments, the high-performance polyamide comprises nylon 4,6, nylon 9T, polyamide 12T, polyamide 10T, or a combination thereof.

Bio-based polyamides are derived from renewable resources, often partially or fully replacing petroleum-based raw materials. In some embodiments, the bio-based polyamide comprises nylon 11, nylon polyamide 610, polyamide 612, or a combination thereof.

Polyamide copolymers are created by blending different types of polyamides to achieve specific material properties. These can offer a balance of flexibility, toughness, and processability. In some embodiments, the polyamide copolymer comprises nylon 6/12, nylon 6/66, or a combination thereof.

Thermoplastic elastomer polyamides (TPE-A) are a type of polyamide that behaves like rubber but can be processed like a plastic. These materials combine the elasticity of elastomers with the processing advantages of thermoplastics.

In some embodiments, each of the one or more polyamides comprises particulate matter having a particle size greater than or equal to 2 microns, greater than or equal to 10 microns, greater than or equal to 50 microns, greater than or equal to 100 microns, or greater than or equal to 350 microns, or greater than or equal to 500 microns. In some embodiments, each of the one or more polyamides comprises particulate matter having a particle size less than or equal to 1,500 microns, less than or equal to 1,200 microns, less than or equal to 1,000 microns, less than or equal to 900 microns, less than or equal to 800 microns, or less than or equal to 700 microns. In some embodiments, each of the one or more polyamides comprises particulate matter having a particle size in the range of from 2 to 1,500 microns, from 10 to 1,200 microns, from 50 to 1,000 microns, from 100 to 900 microns, from 350 to 800 microns, or from 500 to 700 microns.

In some embodiments, each of the one or more polyamides has a low load melt index (LLMI) according to ASTM D-1238, 2.16 kg at 230° C., greater than or equal to dg/min, greater than or equal to 34 dg/min, greater than or equal to 36 dg/min, or greater than or equal to 38 dg/min. In some embodiments, each of the one or more polyamides has a LLMI less than or equal to 50 dg/min, less than or equal to 46 dg/min, less than or equal to 44 dg/min, or less than or equal to 42 dg/min. In some embodiments, each of the one or more polyamides has a LLMI in the range of from 30 dg/min to 50 dg/min, from 34 dg/min to 46 dg/min, from 36 dg/min to 44 dg/min, or from 38 dg/min to 42 dg/min.

In some embodiments, each of the one or more polyamides has a medium load melt index (MLMI) according to ASTM D-1238, 5 kg at 230° C., greater than or equal to 110 dg/min, greater than or equal to 115 dg/min, to 46 dg/min, greater than or equal to 120 dg/min, or greater than or equal to 125 dg/min. In some embodiments, each of the one or more polyamides has a MLMI less than or equal to 160 dg/min, less than or equal to 150 dg/min, less than or equal to 140 dg/min, or less than or equal to 135 dg/min. In some embodiments, each of the one or more polyamides has a LLMI in the range of from 110 dg/min to 160 dg/min, from 115 dg/min to 150 dg/min, from 120 dg/min to 140 dg/min, or from 125 dg/min to 135 dg/min.

In some embodiments, the PPA is added to a polymer in an amount effective to produce a polymer composition comprising the one or more polyamides in an amount greater than or equal to 160 ppm, greater than or equal to 230 ppm, greater than or equal to 300 ppm, greater than or equal to 370 ppm, greater than or equal to 440 ppm, greater than or equal to 510 ppm, greater than or equal to 580 ppm, greater than or equal to 650 ppm, greater than or equal to 720 ppm. or greater than or equal to 790 ppm.

In some embodiments, the PPA is added to a polymer in an amount effective to produce a polymer composition comprising the one or more polyamides in an amount less than or equal to 2,200 ppm, less than or equal to 2,100 ppm, less than or equal to 2,000 ppm, less than or equal to 1,900 ppm, less than or equal to 1,800 ppm, less than or equal to 1,700 ppm, less than or equal to 1,600 ppm, less than or equal to 1,500 ppm, less than or equal to 1,400 ppm, or less than or equal to 1,300 ppm.

In some embodiments, the PPA is added to a polymer in an amount effective to produce a polymer composition comprising the one or more polyamides in an amount in the range of from 160 ppm to 2,200 ppm, from 230 ppm to 2,100 ppm, from 300 ppm to 2,000 ppm, from 370 ppm to 1,900 ppm, from 440 ppm to 1,800 ppm, from 510 ppm to 1,700 ppm, from 580 ppm to 1,600 ppm, from 650 ppm to 1,500 ppm, from 720 ppm to 1,400 ppm, or from 790 ppm to 1,300 ppm.

Polyphosphites

In some embodiments, each of the one or more polyamides is an organic polyphosphite. Polyphosphites can be categorized based on their molecular structure, functional groups, and application types. In some embodiments, each of the one or more polyamides comprises an alkyl polyphosphite, an aryl polyphosphite, a cyclic polyphosphite, an oligomeric polyphosphite, a mixed polyphosphite, a high-performance polyphosphite, or a combination thereof.

In some embodiments, alkyl polyphosphite polymers comprise poly(tris(2-ethylhexyl) phosphite), poly(tris(dodecyl) phosphite), a poly(tris(butyl) phosphite), or a combination thereof.

In some embodiments, aryl polyphosphite polymers, comprise poly(triphenyl phosphite), poly(tris(nonylphenyl) phosphite), poly(diphenyl isodecyl phosphite), or a combination thereof.

In some embodiments, cyclic polyphosphite polymers comprise poly(2,4,6-tri-tert-butylphenyl phosphite), poly (tetramethyl bisphenol A phosphite), poly(butylated cyclic phosphite), or a combination thereof.

In some embodiments, oligomeric polyphosphite polymers, comprise poly(oligomeric triphenyl phosphite), oligomeric poly(alkylphenyl phosphite), or a combination thereof.

In some embodiments, mixed polyphosphite polymers combine the benefits of both alkyl and aryl groups, such as but not limited to poly(bis(2,4-di-tert-butylphenyl)-ethyl phosphite), poly(alkylphenyl phosphite), poly(bis(phenyl/alkyl) phosphite), or a combination thereof.

In some embodiments, high-performance phosphite polymers comprise poly(Ultranox™ 626) (available from Addivant), poly(Irgafos™ 168) (available from BASF), poly (Doverphos™ S-9228) (available from Dover Chemical Corporation), or a combination thereof.

In some embodiments, each of the one or more polyphosphites is a copolymer of phosphite monomers having two aryl groups, phosphite monomers having three aryl groups, or a combination thereof, and aliphatic alcohols comprising at least one monohydric alcohol and at least one of a dihydric alcohol, trihydric alcohol, a polyhydric alcohol, or a combination thereof. In some embodiments, each of the one or more polyphosphites is a copolymer of phosphite monomers having two phenyl groups, phosphite monomers having three phenyl groups, or a combination thereof, and aliphatic alcohols comprising at least one monohydric alcohol and at least one of a dihydric alcohol, trihydric alcohol, a polyhydric alcohol, or a combination thereof. In some embodiments, at least one of the one more polyphosphites is the reaction product of triphenyl phosphite monomers (A) and aliphatic alcohol monomers (B). The polymerization follows a structured process that enables the formation of polymer chains. Triphenyl phosphite can react through its three available phosphorus-oxygen groups. These groups participate in esterification reactions with alcohol-containing monomers, allowing the formation of ester linkages. The aliphatic alcohols can comprise monomers containing only one alcohol group (B1) or monomers containing two alcohol groups (B2). Each of B1 and B2 are incorporated into the polyphosphite in different ways, which ultimately controls the resulting polymer's structure.

When an A monomer reacts with a B1 monomer, the alcohol group on B1 forms a single ester bond with one of the phosphorus-oxygen groups on A, resulting in the capping of that group. Since B1 has only one reactive hydroxyl group, it prevents further linking of A molecules, effectively terminating the polymer chain at that site. This capping action limits the overall polymer growth and leads to shorter chain segments within the polymer structure.

In contrast, when an A monomer reacts with a B2 monomer, which has two hydroxyl groups at opposite ends of the molecule, an ester bond is formed with one of the phosphorus-oxygen groups of A, while the second hydroxyl group remains free to react with another A molecule. This allows the B2 molecule to act as a bridge between two A molecules, facilitating further polymer chain growth. Each B2 unit thus forms a critical link between successive A units, contributing to the elongation of the polymer and enabling the development of a network-like structure.

The overall structure and molecular weight of the resulting polymer depend on the relative amounts of B1 and B2 present in the reaction mixture. A higher proportion of B1 limits chain length because it caps the reactive A groups, while a higher proportion of B2 leads to more extensive polymerization by creating bridges between A molecules. This controlled polymerization allows for the customization of polymer properties, enabling fine-tuning of characteristics such as molecular weight, chain length, and cross-linking density. In applications such as polymer stabilizers or antioxidants, the precise balance of B1 and B2 determines the material's thermal and mechanical performance. By controlling the ratios of these monomers, manufacturers can tailor polymers for specific uses, ensuring the right balance between processability and stability.

Therefore, the reaction between triphenyl phosphite and the two types of aliphatic alcohols creates a versatile system for producing polymers with tunable properties. B2 molecules serve as the backbone that promotes further chain growth, while B1 molecules cap the chains, offering control over the final molecular structure.

In some embodiments, at least one of the one or more polyphosphites are described by Formula (I) below:

(I)

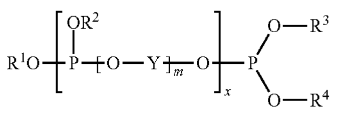

wherein:

each $R^1$, $R^2$, $R^3$ and $R^4$ can be the same or different and independently selected from the group consisting of $C_{12-20}$ alkyl, $C_{12-22}$ alkenyl, $C_{12-40}$ Cycloalkyl, $C_{12-40}$ cycloalkylene, $C_{12-20}$ alkyl glycol ethers and Y—OH as an end-capping group;

each Y is independently selected from the group consisting of $C_{2-40}$ alkylene, $C_{7-40}$ cycloalkylene, $C_{3-20}$ alkyl glycol ethers, $C_{3-40}$ alkyl lactone, and —$R^7$—$N(R^8)$—$R^9$—;

$R^7$, $R^8$ and $R^9$ are independently selected from the group consisting of $C_{1-20}$ alkyl, $C_{2-22}$ alkenyl, $C_{6-40}$ cycloalkyl, $C_{7-40}$ cycloalkylene and H;

m is an integral value ranging from 1 to 100 inclusive;

x is an integral value ranging from 2 to 1,000 with the proviso that when —O—Y is a $C_{3-20}$ alkyl glycol ether, x is an integral value no less than 7; and no more than two of $R^1$, $R^2$, $R^3$ and $R^4$ are terminated with an hydroxyl group.

In some embodiments, at least one of the one or more polyphosphites are described by Formula (II) below:

(II)

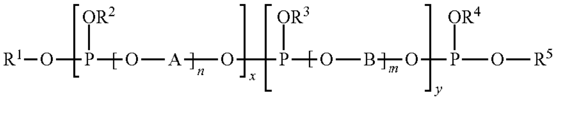

wherein:

each $R^1$, $R^2$, $R^3$, $R^4$ and $R^5$ can be the same or different and independently selected from the group consisting of $C_{12-20}$ alkyl, $C_{12-22}$ alkenyl, $C_{12-40}$ cycloalkyl, $C_{12-40}$ cycloalkenyl, $C_{12-20}$ alkyl glycol ethers and A-OH and B—OH as an end-capping groups;

each A and B are different and independently selected from the group consisting of $C_{2-40}$ alkylene, $C_{7-40}$ cycloalkylene, $C_{3-20}$ alkyl glycol ethers, $C_{3-40}$ alkyl lactone, and —$R^7$—N($R^8$)—$R^9$— wherein $R^7$, $R^8$ and $R^9$ are independently selected from the group $C_{1-20}$ alkyl, $C_{2-22}$ alkenyl, $C_{6-40}$ cycloalkyl, $C_{7-40}$ cycloalkylene and H;

m and n are integral values ranging from 1 to 100 inclusive;

x and y are integral values ranging from 1 to 1,000 wherein x+y sum to at least 3, with the proviso that when —O-A or —O—B are $C_{3-20}$ alkyl glycol ethers, at least one of x or y is an integral value no less than 7; and no more than two of $R^1$, $R^2$, $R^3$, $R^4$ and $R^5$ are terminated with a hydroxyl group.

In some embodiments, at least one of the one or more polyphosphites are described by Formula (III) below:

(III)

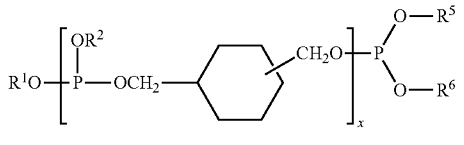

wherein:

each $R^1$, $R^2$, $R^5$ and $R^6$ can be the same or different and independently selected from the group consisting of $C_{1-20}$ alkyl, $C_{2-22}$ alkenyl, $C_{6-40}$ cycloalkyl, $C_{7-40}$ cycloalkylene, $C_{3-20}$ methoxy alkyl glycol ethers, $C_{3-20}$ alkyl glycol ethers or Y—OH (serving as an end capping moiety) for $R^1$, $R^2$, $R^5$ and $R^6$;

Y is selected from the group consisting of $C_{2-40}$ alkylene, $C_{2-40}$ alkyl lactone, and $C_{2-40}$ cycloalkyl and further comprises $C_{2-20}$ alkyl glycol ethers when Y is in the polyphosphite backbone; and x is an integral value ranging from 8 to 1,000.

In some embodiments, at least one of the one or more polyphosphites are described by Formula (IV) below:

(IV)

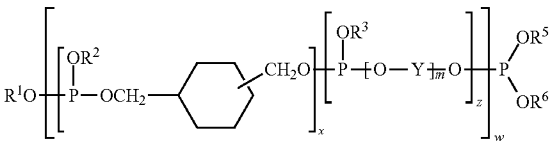

wherein:

where each $R^1$, $R^2$, $R^3$, $R^4$, $R^5$ and $R^6$ can be the same or different and independently selected from the group consisting of $C_{1-20}$ alkyl, $C_{2-22}$ alkenyl, $C_{6-40}$ cycloalkyl, $C_{7-40}$ cycloalkylene, $C_{3-20}$ methoxy alkyl glycol ethers, $C_{3-20}$ alkyl glycol ethers or Y—OH (serving as an end capping moiety) for $R^1$, $R^2$, $R^3$, $R^4$, $R^5$ and $R^6$;

Y is selected from the group consisting of $C_{2-40}$ alkylene, $C_{2-40}$ alkyl lactone, and $C_{2-40}$ cycloalkyl and further comprises $C_{2-20}$ alkyl glycol ethers when Y is in the polyphosphite backbone (e.g., ethylene, propylene, caprylactone, polyalkylene glycol);

x is an integral value ranging from 8 to 1,000;

z is an integral value ranging from 0 to 1,000 with the proviso that when z is 8 or greater, then x is an integral value ranging from 1 to 1,000;

m is an integral value ranging from 1 to 20; and w is an integral value ranging from 1 to 1,000.

In some embodiments, the one of the one or more polyphosphites comprise two or more polyphosphites, wherein each of the two is described by a different one of Formulas (I)-(IV), above. In some embodiments, the one of the one or more polyphosphites comprise three or more polyphosphites, wherein each of the three is described by a different one of Formulas (I)-(IV), above. In some embodiments, the one of the one or more polyphosphites comprise four or more polyphosphites, wherein each of the four is described by a different one of Formulas (I)-(IV), above.

In some embodiments, each of the one or more polyphosphites has a number average molecular number ($M_n$) greater than or equal to 500 g/mol, greater than or equal to 1,000 g/mol, or greater than or equal to 1,500 g/mol. In some embodiments, each of the one or more polyphosphites has a number average molecular number ($M_w$) less than or equal to 5,000 g/mol, less than or equal to 3,500 g/mol, or less than or equal to 2,500 g/mol. In some embodiments, each of the one or more polyphosphites has a number average molecular number ($M_w$) in the range of from 500 to 5,000 g/mol, from 1,000 to 3,500 g/mol, or from 1,500 to 2,500 g/mol.

In some embodiments, each of the one or more polyphosphites has a weight average molecular weight ($M_w$) greater than or equal to 1,000 g/mol, greater than or equal to 2,000 g/mol, or greater than or equal to 3,000 g/mol. In some embodiments, each of the one or more polyphosphites has a weight average molecular weight ($M_w$) less than or equal to 10,000 g/mol, less than or equal to 7,000 g/mol, or less than or equal to 5,000 g/mol. In some embodiments, each of the one or more polyphosphites has a weight average molecular weight ($M_w$) in the range of from 1,000 to 10,000 g/mol, from 2,000 to 7,000 g/mol, or from 3,000 to 5,000 g/mol.

In some embodiments, the PPA is added to a polymer in an amount effective to produce a polymer composition comprising the one or more polyphosphites in an amount greater than or equal to 400 ppm, greater than or equal to 450 ppm, greater than or equal to 500 ppm, greater than or equal to 550 ppm, greater than or equal to 600 ppm, greater than or equal to 650 ppm, greater than or equal to 700 ppm, greater than or equal to 750 ppm, greater than or equal to 800 ppm, or greater than or equal to 850 ppm.

In some embodiments, the PPA is added to a polymer in an amount effective to produce a polymer composition comprising the one or more polyphosphites in an amount less than or equal to 2,200 ppm, less than or equal to 2,100 ppm, less than or equal to 2,000 ppm, less than or equal to 1,900 ppm, less than or equal to 1,800 ppm, less than or equal to 1,700 ppm, less than or equal to 1,600 ppm, less than or equal to 1,500 ppm, less than or equal to 1,400 ppm, or less than or equal to 1,300 ppm.

In some embodiments, the PPA is added to a polymer in an amount effective to produce a polymer composition comprising the one or more polyphosphites in an amount in the range of from 400 ppm to 2,200 ppm, from 450 ppm to 2,100 ppm, from 500 ppm to 2,000 ppm, from 550 ppm to 1,900 ppm, from 600 ppm to 1,800 ppm, from 650 ppm to 1,700 ppm, from 700 ppm to 1,600 ppm, from 750 ppm to 1,500 ppm, from 800 ppm to 1,400 ppm, or from 850 ppm to 1,300 ppm.

Measuring Moments of Molecular Weight for Polyphosphites

Unless otherwise indicated, the distribution and the moments of molecular weight for PPI compounds are determined by using Agilent 1260 Infinity II Multi-Detector GPC/SEC System equipped with an in-series connected detectors for differential refractive index (DRI). Two Agilent PLgel 5-μm Mixed-C columns plus a guard column are used to provide polymer separation. THF solvent from Sigma-Aldrich or equivalent with 250 ppm of antioxidant butylated hydroxytoluene (BHT) is used as the mobile phase. The nominal flow rate is 1.0 ml/min and the nominal injection volume is 25 μL. The whole system including columns, detectors and tubings operates at 40° C. The column calibration was performed by using twenty-three polystyrene narrow standards ranging from 200 to 4,000,000 g/mole.

For determination of molecular weight ($M_w$, $M_n$, and/or $M_z$) of polymers and in particular of ethylene homo- or copolymers, one should use the method described in paragraphs [0044]-[0051] of PCT Publication WO 2019/246069, which description is incorporated by reference herein. Unless specifically mentioned otherwise, all the molecular weight moments used or mentioned in the present disclosure are determined according to the conventional molecular weight (IR molecular weight) determination methods (e.g., as referenced in Paragraphs [0044]-[0045] of the just-noted publication), noting that for the equation in such Paragraph [0044], a=0.695 and K=0.000579 (1-0.75Wt) are used, where Wt is the weight fraction for comonomer PPA Delivery Mechanisms In some embodiments, the PA/PPI PPA can be deployed to a polymer composition as a masterbatch. Such PA/PPI masterbatches generally include PA/PPI PPA and a carrier resin. When PA/PPI PPA is provided in a masterbatch, the masterbatch is provided to the polymer composition in an amount such that the final loading of total and relative amounts of the one or more polyamides and the one or more polyphosphites in the polymer composition is in accordance with the description herein. Thus, a PA/PPI masterbatch having 4 wt % PA/PPI PPA loading can be deployed at 25,000 ppm (2.5 wt %) in a polymer composition (on basis of total mass of the polymer composition, including the masterbatch) to target 1,000 ppm loading of PA/PPI PPA in the polymer composition. The ordinarily skilled artisan will readily be able to recognize PA/PPI PPA masterbatch loading required to achieve desired overall PA/PPI PPA loading in the polymer composition in accordance with the description above of disclose PA loadings, PPI loadings, and PA/PPI blend loadings.

The carrier resin can be any suitable olefinic homopolymers or copolymer, although preferred carrier resins will be generally compatible with the polymers targeted in a given production campaign. That is, for a production campaign of ethylene-based polymers, an ethylene-based carrier resin (e.g., having at least 50 wt % units derived from ethylene) is preferred; while for a production campaign of propylene-based copolymers, such as propylene-ethylene elastomers, a propylene-ethylene copolymer carrier resin, or other propylene-based carrier resin (having at least 50 wt % units derived from propylene) would be preferred. More particularly, a PA/PPI masterbatch for use in LLDPE would employ a LLDPE carrier resin (although it is noted that a Ziegler-Natta catalyzed LLDPE carrier resin may be used for a PA/PPI masterbatch intended for deployment in a polymer composition including mLLDPE, and vice-versa).

Moreover, the carrier resin preferably has melt index (MI, measured at 190° C. and 2.16 kg loading) of 0.8 g/10 min or greater, such as 1.0 g/10 min or greater, or 1.5 g/10 min or greater. In some instances, however, too great a melt index may detrimentally impact final polymer composition properties. Furthermore, excessively high MI in the carrier resin can cause immiscibility with the polymer composition to which the masterbatch is being added. Thus, the carrier resin may have MI within the range from 0.8 or 1.0 or 1.5 g/10 min to 2.5, 3.0, 3.5, 4.0, 4.5, 5.0, 7.5, or 10.0 g/10 min (with ranges from any low end to any high end contemplated); and/or $M_w/M_n$ (ratio of weight-average molecular weight to number-average molecular weight, otherwise referred to as polydispersity or molecular weight distribution) greater than 3.0, preferably greater than or equal to 3.5, 4.0, 4.2, 4.3, 4.4, or 4.5. Particular examples include polyethylene (and in particular LLDPE, either ZN-catalyzed or metallocene-catalyzed) having such MI and/or $M_w/M_n$. Such LLDPE is preferably polymerized in a gas phase polymerization reactor, and can be in accordance with the description of LLDPE suitable for the polymer composition, as described above. Examples include mLLDPE such as Exceed™ performance polyethylene from ExxonMobil, such as Exceed 1018™ or Exceed 2018™ metallocene polyethylene resins; or Marlex™ D139 or D143 from Chevron Phillips Chemical. Other examples include Ziegler-Natta catalyzed LLDPE (ZN-LLDPE), such as copolymers of ethylene and 1-butene, 1-hexene, and/or 1-octene, as catalyzed by Ziegler Natta catalysts (such polymers, as noted, typically having broader molecular weight distribution, $M_w/M_n$, as compared to metallocene-catalyzed counterparts). Examples include LL1001 or LL1002 LLDPE available from ExxonMobil, MARLEX™ 7109 or 7120 LLDPE available from Chevron Phillips Chemical, Dowlex GM 8480G available from Dow Chemical. Yet further suitable examples of polyethylene carrier resin include low density polyethylene (LDPE) as may be produced from free radical polymerization, particularly a high pressure polymerization process.

Polypropylene-based carrier resins (including homopolypropylene or hPP) are also suitable, especially where the PA/PPI processing aid is to be deployed in conjunction with a polypropylene resin.

PA/PPI PPA loading in the masterbatch can be adjusted as needed, and the ordinarily skilled artisan will readily recognize the inverse relationship between PA/PPI PPA loading in the PA/PPI PPA masterbatch, and amount of masterbatch to be deployed in a polymer composition in order to achieve target PA/PPI PPA loading in the polymer composition (e.g., as the PA/PPI PPA masterbatch comprises more PA/PPI PPA, correspondingly less PA/PPI PPA masterbatch need be loaded into the polymer composition). For sake of illustration, example loadings of PA/PPI in PA/PPI PPA masterbatch include PA/PPI PPA within the range from a low of 1, 2, 3, 4, or 5 wt % to a high of 5, 6, 7, 8, 9, 10, 20, 25, 30, 35, 40, 45, 50, or 60 wt %, with ranges from any foregoing low end to any foregoing high end contemplated (provided the high end is greater than the low end). However, it may be preferred to keep PA/PPI PPA loading in the masterbatch relatively lower (e.g., within the 1-10 wt % range, such as from a low of any one of 1, 1.5, 2, or 2.5 wt % to a high of any one of 3, 3.5, 4, 4.5, 5, 7.5, or 10 wt %, with ranges from any low end to any high end contemplated). Thus, a PA/PPI PPA masterbatch comprising 4 wt % PA/PPI PPA (on basis of mass of masterbatch) may be deployed at 2.5 wt % loading (25,000 ppm), on the basis of mass of the polymer composition, to provide 1,000 ppm PA/PPI loading the polymer composition; and deployed at 5.0 wt % loading (50,000 ppm), on the basis of mass of the polymer composition, to provide 2000 ppm PA/PPI PPA loading in the polymer composition. Such relatively low PA/PPI loadings in masterbatch can help ensure an adequate amount of material for case of handling, while not delivering excessive amounts of PA/PPI PPA to the polymer composition (e.g., finished polymer pellets or polymeric article such as film), which could negatively impact toughness properties of polymeric articles.

Finally, as discussed elsewhere herein, additional additives and/or a PA/PPI PPA blend partner may be included in the polymer composition. It is contemplated that such additives and/or PPA blend partner may be added to the polymer composition separately from a PA/PPI masterbatch, or as part of the PA/PPI masterbatch. Thus, for example, a PA/PPI masterbatch can comprise, or preferably can consist or consist essentially of: (i) PA/PPI PPA (e.g., having relative amounts of PA and PPI in accordance with description herein); (ii) carrier resin (e.g., LLDPE or other carrier resin as described above); and (iii) optionally, one or more non-PPA additives. A non-PPA additive is an additive included in a polymer composition for reasons other than prevention of melt fracture in film formation, as would be understood by the ordinarily skilled artisan. As with all PPA and polymer compositions discussed herein, such PA/PPI masterbatch is free or substantially free of fluorine and/or fluorine-containing compounds. Examples of suitable non-PPA additives are discussed in more detail below.

The non-PPA additives suitable for inclusion in the masterbatch can be one or more of the following: UV stabilizers, slip agents, primary antioxidants, secondary antioxidants, and/or anti-block agents; provided that, in the case of the PA/PPI composite, such additive(s) have suitable melting point in accordance with the above description. Other potential non-PPA additives are also mentioned below.

The polymer solids suitable for making PA/PPI-polymer composites advantageously include any of the LLDPE or LDPE already discussed in the context of polymer compositions or as carrier resins of PA/PPI masterbatches, subject to the further desired melting point features just described.

Non-PPA Additives

Non-PPA additives suitable for polymer compositions in accordance with the present disclosure are preferably those free of or substantially free of fluorine and/or fluorine-containing compounds. And, as noted, they are not added for the purpose of eliminating melt fracture in extruded and/or blown films made using the polymer composition.

Non-PPA additives can include UV stabilizers (sometimes referred to as light stabilizers), such as hindered amine light stabilizers (HALS) or UV absorbers (e.g., triazines, hydroxyphenyl triazines, benzotriazoles, hydroxyphenyl benzotriazoles, benzophenones, hydroxybenzophenones, cyanoacrylates, oxanilides, organo-nickel compounds). Carbon black (known as a pigmentation agent) can also act as a UV absorber.

Various slip agents (e.g., amides such as oleamide, erucamide, stearamide, behenamide; secondary fatty acid amides) are also examples of non-PPA additives, as are various anti-block agents. According to various embodiments, it may be advantageous to employ anti-block and/or slip agents with the PA/PPI (including, e.g., in a PA/PPI composite or masterbatch). In particular as regards anti-block and slip agents these may provide a potential advantage of quicker melt fraction elimination when employed with the PA/PPI-based PPA. Examples of anti-block agents are well known in the art, and include mineral type anti-block agents such as talc, crystalline and amorphous (fumed) silica, nepheline syenite, diatomaceous earth, clay (e.g., kaolin clay), zeolites, or various other anti-block minerals. Particular examples include the Optibloc™ agents available from Mineral Technologies. Examples of slip agents for polyolefins include amides such as erucamide, stearamide, behenamide, oleyl palmitamide, stearyl erucamide, ethylene-bis-stearamide, ethylene-bis-oleamide, and combinations thereof; as well as other primary fatty amides like oleamide; and further include certain types of secondary (bis) fatty amides and/or secondary fatty acid amides such as oleyl palmitamide, stearyl erucamide, ethylene-bis-stearamide, and/or ethylene-bis-oleamide. Anti-block agent loading in the polymer composition is often around 500 to 6000 ppm, such as 1000 to 5000 ppm; slip agent loading in the polymer composition is typically 200 to 1000, 2000, or 3000 ppm. It will be appreciated that where anti-block and/or slip agents are included in a masterbatch (e.g., PA/PPI masterbatch), then loading in the masterbatch and amount of masterbatch provided should be adjusted to target these loadings in the resultant polymer composition to which the masterbatch is provided (for example, to achieve 1000 ppm of anti-block agent in the resultant polymer composition, one can deploy 2.5 wt % (on basis of masterbatch+polymer composition) of a masterbatch having 4 wt % anti-block agent loading in the masterbatch).

Primary and secondary antioxidants are further examples of non-PPA additives. These compounds are also sometimes referred to as thermal stabilizers. The “primary” antioxidants typically act as free-radical scavengers; and the “secondary” antioxidants typically act as peroxide scavengers, sometimes referred to as hydroperoxide decomposers. Hindered phenols, such as butylated hydroxytoluene (BHT), Vitamin E (alpha-tocopherol) are common examples of primary antioxidants. Further examples include di-tert-butylphenyl compounds. The IRGANOX™ product line available from BASF are typical examples of suitable hindered phenol primary antioxidants (Irganox™ 245, Irganox™ 1010, Irganox™ 1076, Irganox™ MD 1024, Irganox™ 3114, Irganox™ 1098, Irganox™ 3052, Cyanox™ 2246, ADK STAB AO-80). Other radical scavengers used as primary antioxidants include hydroxylamines such as oxidized bis(hydrogenated tallow alkyl)amines, an example being Irgastab™ FS042 from BASF. Phosphite antioxidants are common examples of secondary antioxidants (peroxide scavengers), and typical examples include monophosphites, diphosphites, and mixed phosphites. Examples of suitable monophosphites include: tris nonyl phenyl phosphite (TNPP) and tris(2,4 di-tert-butylphenyl) phosphite (tradename IRGAFOS™ 168, available from BASF; or tradename Alkanox™ 240, available from SI Group). Examples of diphosphites (containing at least two phosphorus atoms per phosphite molecule) and diphosphonites include: distearyl pentaerythritol diphosphite, diisodecyl pentacrythritol diphosphite, tetrakis(2,4-di-tert-butylphenyl)-4,4-biphenyldiphosphonite (commonly referred to as PEPQ powder), bis(2,4 di-tert-butylphenyl) pentacrythritol diphosphite (sold under the trade name ULTRANOX® 626, 20) by SI Group), bis(2,6-di-tert-butyl-4-methylphenyl) pentaerythritol diphosphite; bisisodecyloxy-pentacrythritol diphosphite, bis(2,4-di-tert-butyl-6-methylphenyl) pentacrythritol diphosphite, bis(2,4,6-tri-tert-butylphenyl) pentacrythritol diphosphite, and bis(2,4-dicumylphenyl) pentacrythritol diphosphite (sold under the trade name DOVERPHOS™ S9228 by Dover Chemicals Corporation, optionally with 1% triisopropanol amine (as DOVERPHOS™ S9228-T)). Proprietary phosphite antioxidants are also available and known, such as Weston™ 705 from SI Group, comprising proprietary liquid phosphite(s). Primary and/or secondary antioxidants can be particularly useful for inclusion in a masterbatch or PA/PPI composite since these compounds are often included to protect polymers such as polyethylene from free radical decomposition, thus they may be particularly useful for inclusion in any masterbatch having a carrier resin such as a polyethylene (e.g., LDPE or LLDPE) carrier resin. Primary antioxidant loading in the resultant polymer composition (after delivery of any masterbatch containing primary antioxidant) is preferably within the range from a low of 200, 300, or 400 ppm to a high of 600, 700, 800, 900, 1,000, 1,250, 1,500, 1,750, or 2,000 ppm (with ranges from any foregoing low to any foregoing high contemplated, such as 200 to 2,000 ppm or 300 to 800 ppm). Secondary antioxidant loading in the resultant polymer composition (after delivery of any masterbatch and/or composite containing secondary antioxidant) is preferably within the range from a low of 400, 450, 500, 550, 600, 650, 700, 750, 800, or 850 ppm to a high of 1,300, 1,400, 1,500, 1,600, 1,700, 1,800, 1,900, 2,000, 2,100, or 2,200 ppm (with ranges from any foregoing low to any foregoing high contemplated, such as 400 to 2,200 ppm or 850 to 1300 ppm). In some embodiments, the secondary antioxidant loading in the resultant polymer composition comprises at least 80 wt %, at least 90 wt %, at least 95 wt %, at least 99 wt %, at least 99.9 wt %, or at least 99.99 wt % of the PPI component disclosed herein, based on the total weight of secondary antioxidant in the resultant polymer composition. In some embodiments, the resultant polymer composition is substantially free of or free of secondary antioxidant other than the PPI component disclosed herein.

Other non-PPA additives can include, for example one or more of the following: acid scavengers (metal stearates, or Al—Mg hydrocycarbonates such as hydrotalcite, zinc oxide, magnesium oxide); nucleating agents (talc, sodium benzoate, certain phosphates such as Irgastab™ NA-11 from BASF); clarifiers (DMDBS such as Millad™ 3988 or MDBS such as Millad™ 3940, both from Milliken); anti-fog agents; fillers; anti-cling additives; tackifiers, such as polybutenes, terpene resins, aliphatic and aromatic hydrocarbon resins, alkali metal and glycerol stearates, and hydrogenated rosins; heat stabilizers; release agents; anti-static agents; pigments; colorants; dyes; waxes; talc; mixtures thereof, and the like.

With any of the foregoing additives, it is useful to note that the same of any given type of additive may be present in both the base polymer composition (before addition of any PA/PPI masterbatch or PA/PPI composite) and in the PA/PPI masterbatch and/or PA/PPI composite. The guidance above is provided for final loading of additives in the polymer composition after inclusion of the masterbatch or composite. The ordinarily skilled artisan with the benefit of this disclosure will readily be able to determine preferred additive loading in a masterbatch or composite in combination with amount of masterbatch to deliver to the polymer composition in order to obtain the resultant target loading in the polymer composition. For example, to achieve final antioxidant (primary or secondary) loading of 400-500 ppm, one could recognize that, e.g., 400 ppm of the antioxidant could be present in the polymer composition, in which case addition of 2.5 wt % masterbatch to the polymer composition (on basis of polymer composition+masterbatch) can maintain antioxidant target when the antioxidant is present in the masterbatch at 0 to 0.4 wt % (0 to 4,000 ppm).

PPA additives other than PA/PPI advantageously need not be employed, and thus the PA/PPI masterbatches, PA/PPI composites, polymer compositions, and/or polymer products of the present disclosure advantageously are free or substantially free of fluorine and/or fluorine-containing compounds; silicone and silicone-containing compounds (such as polysiloxanes); polycaprolactones; and the like. In some embodiments, certain PPA additives other than PA/PPI can be used in conjunction with PA/PPI PPA, and the PA/PPI masterbatches, PA/PPI composites, polymer compositions, and/or polymer products of the present disclosure can further other PPA additives, such as but not limited to polyethylene glycol (PEG).

Methods of Introducing PA/PPI Masterbatches to Polymer Compositions

Methods in accordance with various embodiments generally include adding PA/PPI PPA to a polymer composition to form a polymer product. The addition of PA/PPI PPA can be to polymer granules (e.g., reactor-grade polymer exiting a polymerization reactor system but upstream of finishing processes such as compound extrusion and/or pelletization), and the polymer product formed thereby is in the form of polymer pellets with PA/PPI PPA additive. In such instances, the polymer composition can be taken as the polymer granules, and the polymer product as the pellets. In other cases, the PA/PPI PPA can be added to a polymer composition (such as finished pellets) being fed to a film or other polymeric article extrusion process, to form a polymer product in the form of a polymeric film or other article (e.g., a blown film). In such instances, the polymer composition is taken as the polymer pellets being fed to the film extrusion process (or other article formation process), and the polymer product is taken as the polymeric film (or other article).

Furthermore, in some embodiments, the method of PA/PPI PPA delivery in any of the just-noted circumstances is introduction of a PA/PPI PPA masterbatch (also as described above) to the polymer composition. A PA/PPI PPA masterbatch can be provided to a polymer composition of either type (pre-finished, reactor grade polymer composition so as to form polymer pellets; or polymer pellet composition, so as to form a polymeric article).

Providing the PA/PPI PPA can be carried out in batch (e.g., melt mixing in a mixing tank, blender, or the like), but it is preferably carried out on a continuous basis during at least a portion of a continuous extrusion process. For instance, methods can include (a) continuously extruding a polymer composition through an extruder to form polymer product; and (b) during at least a portion of the extruding (preferably, but not necessarily, during the entirety of the extruding), continually feeding a PA/PPI PPA masterbatch to the extruder so that the PA/PPI PPA masterbatch and polymer composition are coextruded through the extruder at conditions sufficient to melt blend the PA/PPI PPA masterbatch and the polymer composition. The PA/PPI PPA masterbatch comprises solid particles of PA/PPI and one or more non-PPA additives. In such processes, the polymer composition can be polymer granules or other reactor-grade polymer, such that the continuous extrusion is compounding extrusion; and the polymer product formed is in the form of finished polymer pellets. Alternatively, the polymer composition can be in the form of already-finished polymer pellets; the extrusion is part of a polymeric filmmaking process (or part of a process for producing another polymeric article); and the polymer product is a polymeric film such as a blown film, or other polymeric article.

In some instances, a polymer composition may be utilized in extrusion for filmmaking, e.g., blown filmmaking, under conditions that may require feeding PA/PPI during some or all of the extrusion. This can be the case even when the polymer composition being used in the filmmaking extrusion process already has PA/PPI or other processing aid, e.g., where processing conditions are such that melt fracture develops after a substantial portion of film production without melt fracture. In particular, the present inventors have found that harsh film processing conditions can lead to re-development of melt fracture, even in PA/PPI-containing polymer, after sometimes substantial periods of time producing otherwise melt fracture-free film (e.g., after 5, 6, or more hours of producing melt fracture-free film). The phenomenon is believed to be tied to a combination of the die factor (a function of polymer throughput through a die and cross-sectional size of the die, such as circumference of the die in a blown film extrusion process) and the die gap (the thickness of the ring or other aperture through which the polymer is extruded), and in particular is thought to vary proportionally with $[\text{die factor}]/[\text{die gap}]^2$, where die factor may be expressed as lb/(hr*in die), wherein die is the circumference of the die (or greatest cross-sectional width); and die gap is in mil. Thus, an "Extrusion Processing Factor" can be defined, where $EPF=100\times[\text{die factor}]/[\text{die gap}]^2$, with a larger value of EPF being indicative of more harsh processing conditions. When framed in these units, one or more of the following can indicate the need for additional PA/PPI (e.g., even where PA/PPI is already present in a polymer composition) during filmmaking extrusion such as blown film extrusion: die gap of 90 mil or less, such as 70 mil or less, such as 60 mil or less, or 50 mil or less; die factor of 10 or more, such as 15 or greater, or 20 or greater; and EPF of 0.4 or greater. It will be appreciated that, for a smaller die gap, die factor need not necessarily be large to still encounter harsh processing conditions that may merit added PPA delivery.

Thus, the present disclosure also provides processes for making polymeric film, the processes including: (a) for a first time interval, continuously extruding a polymer composition through an extruder at extrusion conditions to form the polymeric film; (b) at a first time endpoint during the continuous extrusion, developing one or more melt fractures in the polymeric film; (c) in response to developing the one or more melt fractures in the film, continuously feeding a PPA masterbatch to the extruder during a second time interval after the first time interval; and (d) continuously obtaining the polymeric film at least during the second time interval (and optionally during both the first and second time intervals). As with other polymer compositions described herein, the polymeric film is free or substantially free of fluorine and/or fluorine-containing compounds, and likewise can be free or substantially free of other PPA compounds besides the PA/PPI (e.g., free of silicone/silicone-containing compounds, and/or free or substantially free of caprolactone-containing compounds. Any polymeric film obtained during the first time interval may have mixture of one or more PAS and one or more PPIs present in an amount in the range of from 350 ppm to 2,600 ppm, from 400 ppm to 2,500 ppm, from 500 ppm to 2,400 ppm, from 550 ppm to 2,300 ppm, from 600 ppm to 2,200 ppm, from 700 ppm to 2,000 ppm, from 800 ppm to 1,900 ppm, from 850 ppm to 1,800 ppm, from 900 ppm to 1,700 ppm, or from 1,000 ppm to 1,600 ppm, based on the weight of such polymeric film or the polymer composition from which the film is made; polymeric film obtained during the second time interval will have more PA/PPI than that obtained during the first time interval.

However, it is preferred not to add excessive amounts of PA/PPI to avoid or eliminate melt fracture. It is found that excessive levels of PA/PPI can detrimentally impact certain toughness properties of a polymeric film product, in particular dart impact (e.g., as measured by Dart A phenolic, in g/mil). Therefore, care should be taken in delivering an appropriate amount of PA/PPI to eliminate/prevent melt fracture while minimizing detrimental impact to film properties. It is found that PA/PPI loading in the polymeric film or other article (especially that obtained during the second time interval in connection with methods just described) is increased over that of the first time interval. In some embodiments, the PPA masterbatch is added such that the polymeric film obtained during the second time interval comprises the mixture of one or more PAs and one or more PPIs in an amount in the range of from 560 ppm to 4,400 ppm, from 680 ppm to 4,200 ppm, from 800 ppm to 4,000 ppm, from 920 ppm to 3,800 ppm, from 1,040 ppm to 3,600 ppm, from 1,160 ppm to 3,400 ppm, from 1,280 ppm to 3,200 ppm, from 1,400 ppm to 3,000 ppm, from 1,520 ppm to 2,800 ppm, or from 1,640 ppm to 2,600 ppm, based on the weight of the polymeric film (e.g., because of PA/PPI already present in the polymer before film extrusion), any PA/PPI added during the filmmaking extrusion (e.g., per methods just described) should be added in amounts such that the polymeric film comprises less than or equal to 4,400 ppm of PA/PPI, less than or equal to 4,200 ppm, less than or equal to 4,000 ppm, less than or equal to 3,800 ppm, less than or equal to 3,600 ppm, less than or equal to 3,400 ppm, less than or equal to 3,200 ppm, less than or equal to 3,000 ppm, less than or equal to 2,800 ppm, or less than or equal to 2,600 ppm, such as within the range from 560 ppm, 680 ppm, 800 ppm, 920 ppm, 1,040 ppm, 1,160 ppm, 1,280 ppm, 1,400 ppm, 1,520 ppm, or 1,640 ppm to 2,600 ppm, 2,800 ppm, 3,000 ppm, 3,200 ppm, 3,400 ppm, 3,600 ppm, 3,800 ppm, 4,000 ppm, 4,200 ppm, or 4,400 ppm, based the weight of the polymeric film (with ranges from any low end to any high end contemplated).

The above methods and any other methods of mixing the PA/PPI (or PA/PPI-based PPA) with polymer to form a polymer composition as described herein, also include adequately mixing the PA/PPI into the polymer. The present inventors have surprisingly found that not all methods of mixing PA/PPI may be sufficient; instead, the PA/PPI (or PA/PPI-based PPA composition) should be melt blended at sufficiently high temperature and/or specific energy input (total mechanical energy forced into a polymer per unit weight, e.g., J/g, a metric for extent of mixing) with the polymer to achieve adequate homogenization among PA/PPI and polymer. For instance, melt-blending such as through melting and then co-extrusion of the PA/PPI and polymer (e.g., in a compounding extruder) under elevated temperature (e.g., 150° C. or more, such as 200° C. or more) can achieve adequate homogenization, while simply melting the PA/PPI and tumble-blending with polymer does not achieve adequate homogenization. Thus, methods of various embodiments include mixing the PA/PPI and polymer (e.g., polyethylene) in a manner that ensures both components melt during the mixing (e.g., melt-mixing, coextrusion in a compound extruder). Preferred methods according to some embodiments include melt-blending and coextruding the PA/PPI and polymer (and optional other additives) in a compounding extruder, and pelletizing the mixture upon its exit from the extruder, thereby locking the homogenously blended mixture in place. More specifically, such methods can include: (a) feeding a PA/PPI composition and a polymer (e.g., polyethylene) into an extruder (optionally with other additives); (b) coextruding the PA/PPI composition and polymer in the extruder at an elevated temperature suitable for melting both the PA/PPI and the polymer (e.g., 200° C. or higher); and (c) pelletizing the extrudate to form the polymer composition comprising the PA/PPI-based PPA. Preferably, the extrusion is carried out under oxygen-poor atmosphere (e.g., nitrogen atmosphere).

In the above discussion, as with other discussions herein, where "PA/PPI" is referenced, a PA/PPI masterbatch or PA/PPI composite may be substituted therefor, as long as the relative amounts of PA/PPI delivered to a polymer composition via masterbatch remain consistent with amounts of PA/PPI alone that would be delivered to the polymer composition.

Films

As noted, a significant reason for employing PPAs is to eliminate melt fracture in blown films. Ideally, when replacing incumbent PPAs with the PA/PPI-based PPA composition of the present disclosure, films made from polymer compositions including such PA/PPI-based PPA composition will exhibit similar or superior properties as compared to films made using polymer compositions comprising conventional PPA.

Thus, the invention of the present disclosure can also be embodied in a film made from any of the above-described polymer compositions (and in particular, polyethylene compositions) comprising the polymer and PA/PPI PPA within the range from 560 ppm, 680 ppm, 800 ppm, 920 ppm, 1,040 ppm, 1,160 ppm, 1,280 ppm, 1,400 ppm, 1,520 ppm, or 1,640 ppm to 2,600 ppm, 2,800 ppm, 3,000 ppm, 3,200 ppm, 3,400 ppm, 3,600 ppm, 3,800 ppm, 4,000 ppm, 4,200 ppm, or 4,400 ppm, based the weight of the polymeric film (with ranges from any low end to any high end contemplated), and preferably being free or substantially free of fluorine and/or fluorine-containing compounds; wherein the film has one or more of (and preferably all of):

i. a 1% secant modulus (MD) within ±15%, within ±10%, or within ±5% of the value (psi) of the benchmark film;
ii. a dart drop within ±15%, within ±10%, or within ±5% of the value (g) of the benchmark film; or
iii. an Elmendorf tear (MD) within ±20%, within ±15%, or within ±10% of the value (g/mil) benchmark film;
iv. a MD gloss 45° within ±15 GU, within ±10 GU, or within ±5 GU of the value (in GU) of the benchmark film, and/or MD gloss 45° greater than or equal to 40 GU or greater than or equal to 43 GU; and
iv. a total haze within ±15% haze, within ±10% haze, or within ±5% haze of the value (in % haze) of the benchmark film, and/or total haze less than or equal to 20% or less than or equal to 16%.

Further, in the discussion above, a film "made using a fluoropolymer-based PPA instead of the PA/PPI-based PPA composition but is otherwise identical" is intended to mean that a film made using an effective amount of PA/PPI PPA composition is compared against a film made using an effective amount of fluoropolymer-based PPA; not necessarily that the same amount of each PPA is used. An effective amount is such that visible melt fractures are eliminated from the film, consistent with the discussion in connection with Example 1.

Certain Embodiments

Disclosed herein is a polymer composition comprising a $C_2$-$C_6$ olefin homopolymer or a copolymer of two or more $C_2$-$C_{20}$ α-olefins and a polymer processing aid. In a first set of embodiments, the polymer processing aid comprises a mixture of one or more polyamides and one or more polyphosphites. In further embodiments, the polymer composition comprises an ethylene homopolymer or a copolymer of ethylene and one or more $C_3$ to $C_{20}$ α-olefins. In some embodiments, the polymer composition comprises: a Ziegler-Natta catalyzed copolymer of ethylene and one or more of 1-butene, 1-hexene, and 1-octene; a metallocene catalyzed copolymer of ethylene and one or more of 1-butene, 1-hexene, and 1-octene; or a combination thereof. In some embodiments, the polymer composition comprises a metallocene catalyzed copolymer of ethylene and one or more of 1-butene, 1-hexene, and 1-octene; or a combination thereof.

The mixture of one or more polyamides and one or more polyphosphites is present in the polymer processing aid in an amount greater than or equal to 80 wt %, greater than or equal to 90 wt %, greater than or equal to 99 wt %, greater than or equal to 99.9 wt %, or greater than or equal to 99.99 wt %, based on the total weight of the PPA. In some embodiments, the PPA consists essentially of the PA/PPI mixture. In some embodiments, the PPA consists of the PA/PPI mixture.

In some of the first set of embodiments, the PPA is added to a polymer in an amount effective to produce a polymer composition comprising the mixture of the one or more polyamides and the one or more polyphosphites in an amount:

a) greater than or equal to 560 ppm, greater than or equal to 680 ppm, greater than or equal to 800 ppm, greater than or equal to 920 ppm, greater than or equal to 1,040 ppm, greater than or equal to 1,160 ppm, greater than or equal to 1,280 ppm, greater than or equal to 1,400 ppm, greater than or equal to 1,520 ppm, or greater than or equal to 1,640 ppm;
b) less than or equal to 4,400 ppm, less than or equal to 4,200 ppm, less than or equal to 4,000 ppm, less than or equal to 3,800 ppm, less than or equal to 3,600 ppm, less than or equal to 3,400 ppm, less than or equal to 3,200 ppm, less than or equal to 3,000 ppm, less than or equal to 2,800 ppm, or less than or equal to 2,600 ppm; or
c) in the range of from 560 ppm to 4,400 ppm, from 680 ppm to 4,200 ppm, from 800 ppm to 4,000 ppm, from 920 ppm to 3,800 ppm, from 1,040 ppm to 3,600 ppm, from 1,160 ppm to 3,400 ppm, from 1,280 ppm to 3,200 ppm, from 1,400 ppm to 3,000 ppm, from 1,520 ppm to 2,800 ppm, or from 1,640 ppm to 2,600 ppm.

In some of the first set of embodiments, the mixture of the one or more polyamides and the one or more polyphosphites comprises the one or more polyamides and the one or more polyphosphites in a ratio of the weight of the one or more polyamides to weight of the one or more polyphosphites in the range of from 6:1 to 1:25, from 5:1 to 1:20, from 4:1 to 1:15, from 3:1 to 1:8, or from 2:1 to 1:3, based on the total weight of the one or more polyamides and the one or more polyphosphites.

A second set of embodiments comprises each of the compositions of the first set of embodiments of embodiments, wherein each one of the one or more polyamides comprises an aliphatic polyamide, an aromatic polyamide (aramid), a semi-aromatic polyamide, a high-performance polyamide, a bio-based polyamide, a polyamide copolymer, a thermoplastic elastomer polyamide, or a combination thereof. In some embodiments, the aliphatic polyamide (nylon) comprises nylon 6, nylon 6,6, nylon 12, or a combination thereof. In some embodiments, the aromatic polyamide (aramid) comprises Kevlar™ material (available from DuPont), Nomex™ material (available from DuPont, or a combination thereof. In some embodiments, the semi-aromatic polyamide comprises nylon 6T, nylon 6I, nylon MXD6, or a combination thereof. In some embodiments, the high-performance polyamide comprises nylon 4,6, nylon 9T, polyamide 12T, polyamide 10T, or a combination thereof. In some embodiments, the bio-based polyamide comprises nylon 11, nylon polyamide 610, polyamide 612, or a combination thereof. In some embodiments, the polyamide copolymer comprises nylon 6/12, nylon 6/66, or a combination thereof. In some embodiments, thermoplastic elastomer polyamides (TPE-A) comprise Pebax™ (a family of polyether block amides available from Arkema), Grilamid™ (a series of high-performance TPE polyamides available from EMS-GRIVORY), Vestamid™ E (a polyether block amide available from Evonik), Elastollan™ TPE-A (available from BASF), or Zytel™ TPE-A (available from DuPont).

A third set of embodiments comprises each of the compositions of the first set of embodiments and the second set of embodiments, wherein each of the one or more polyamides comprises particulate matter having a particle size:

a) greater than or equal to 2 microns, greater than or equal to 10 microns, greater than or equal to 50 microns, greater than or equal to 100 microns, or greater than or equal to 350 microns, or greater than or equal to 500 microns;
b) less than or equal to 1,500 microns, less than or equal to 1,200 microns, less than or equal to 1,000 microns, less than or equal to 900 microns, less than or equal to 800 microns, or less than or equal to 700 microns. In some embodiments, each of the one or more polyamides comprises particulate matter having a particle size in the range of from 2 to 1,500 microns, from 10 to 1,200 microns, from 50 to 1,000 microns, from 100 to 900 microns, from 350 to 800 microns, or from 500 to 700 microns; or
c) in the range of from 2 to 1,500 microns, from 10 to 1,200 microns, from 50 to 1,000 microns, from 100 to 900 microns, from 350 to 800 microns, or from 500 to 700 microns.

A fourth set of embodiments comprises each of the compositions of the first set through the third sets of embodiments, wherein each of the one or more polyamides has a low load melt index (LLMI) according to ASTM D-1238, 2.16 kg at 230° C.:

a) greater than or equal to 30 dg/min, greater than or equal to 34 dg/min, greater than or equal to 36 dg/min, or greater than or equal to 38 dg/min;
b) less than or equal to 50 dg/min, less than or equal to 46 dg/min, less than or equal to 44 dg/min, or less than or equal to 42 dg/min; or
c) in the range of from 30 dg/min to 50 dg/min, from 34 dg/min to 46 dg/min, from 36 dg/min to 44 dg/min, or from 38 dg/min to 42 dg/min.

A fifth set of embodiments comprises each of the compositions of the first through the fourth sets of embodiments, wherein each of the one or more polyamides has a medium load melt index (MLMI) according to ASTM D-1238, 5 kg at 230° C.:

a) greater than or equal to 110 dg/min, greater than or equal to 115 dg/min, to 46 dg/min, greater than or equal to 120 dg/min, or greater than or equal to 125 dg/min;
b) less than or equal to 160 dg/min, less than or equal to 150 dg/min, less than or equal to 140 dg/min, or less than or equal to 135 dg/min; or
c) in the range of from 110 dg/min to 160 dg/min, from 115 dg/min to 150 dg/min, from 120 dg/min to 140 dg/min, or from 125 dg/min to 135 dg/min.

A sixth set of embodiments comprises each of the compositions of the first through the fifth sets of embodiments, wherein the PPA is added to a polymer in an amount effective to produce a polymer composition comprising the one or more polyamides in an amount:

a) greater than or equal to 160 ppm, greater than or equal to 230 ppm, greater than or equal to 300 ppm, greater than or equal to 370 ppm, greater than or equal to 440 ppm, greater than or equal to 510 ppm, greater than or equal to 580 ppm, greater than or equal to 650 ppm, greater than or equal to 720 ppm. or greater than or equal to 790 ppm;
b) less than or equal to 2,200 ppm, less than or equal to 2,100 ppm, less than or equal to 2,000 ppm, less than or equal to 1,900 ppm, less than or equal to 1,800 ppm, less than or equal to 1,700 ppm, less than or equal to 1,600 ppm, less than or equal to 1,500 ppm, less than or equal to 1,400 ppm, or less than or equal to 1,300 ppm; or
c) in the range of from 160 ppm to 2,200 ppm, from 230 ppm to 2,100 ppm, from 300 ppm to 2,000 ppm, from 370 ppm to 1,900 ppm, from 440 ppm to 1,800 ppm, from 510 ppm to 1,700 ppm, from 580 ppm to 1,600 ppm, from 650 ppm to 1,500 ppm, from 720 ppm to 1,400 ppm, or from 790 ppm to 1,300 ppm.

A seventh set of embodiments comprises each of the compositions of the first through the sixth sets of embodiments, wherein each of the one or more polyphosphites is an organic polyphosphite. In some embodiments, each of the one or more polyphosphites comprises an alkyl polyphosphite, an aryl polyphosphite, a cyclic polyphosphite, an oligomeric polyphosphite, a mixed polyphosphite, a high-performance phosphite polymer, or a combination thereof. In some embodiments, the one or more polyphosphites comprises a poly(tris-aryl phosphite) polymeric structure. In some embodiments, alkyl polyphosphite polymers comprise poly(tris(2-ethylhexyl) phosphite), poly(tris(dodecyl) phosphite), a poly(tris(butyl) phosphite), or a combination thereof. In some embodiments, aryl polyphosphite polymers, comprise poly(triphenyl phosphite), poly(tris(nonylphenyl) phosphite), poly(diphenyl isodecyl phosphite), or a combination thereof. In some embodiments, cyclic polyphosphite polymers comprise poly(2,4,6-tri-tert-butylphenyl phosphite), poly(tetramethyl bisphenol A phosphite), poly (butylated cyclic phosphite), or a combination thereof. In some embodiments, oligomeric polyphosphite polymers, comprise poly(oligomeric triphenyl phosphite), oligomeric poly(alkylphenyl phosphite), or a combination thereof. In some embodiments, mixed polyphosphite polymers combine the benefits of both alkyl and aryl groups, such as but not limited to poly(bis(2,4-di-tert-butylphenyl)-ethyl phosphite), poly(alkylphenyl phosphite), poly(bis(phenyl/alkyl) phosphite), or a combination thereof. In some embodiments, high-performance phosphite polymers comprise poly(Ultranox™ 626) (available from Addivant), poly(Irgafos™ 168) (available from BASF), poly(Doverphos™ S-9228) (available from Dover Chemical Corporation), or a combination thereof.

An eighth set of embodiments comprises each of the compositions of the first through the sixth sets of embodiments, wherein each of the one or more polyphosphites is a copolymer of phosphite monomers having two aryl groups, phosphite monomers having three aryl groups, or a combination thereof, or each of the one or more polyphosphites is a copolymer of phosphite monomers having two phenyl groups, phosphite monomers having three phenyl groups, or a combination thereof, and aliphatic alcohols comprising at least one monohydric alcohol and at least one of a dihydric alcohol, trihydric alcohol, a polyhydric alcohol, or a combination thereof. In some embodiments, at least one of the one more polyphosphites is the reaction product of triphenyl phosphite monomers (A) and aliphatic alcohol monomers (B). The aliphatic alcohols can comprise monomers containing only one alcohol group (B1) or monomers containing two alcohol groups (B2). Further detail related to these polyphosphite compositions can be found in U.S. Pat. No. 11,472,928, the contents of which of fully incorporated by reference herein.

A ninth set of embodiments comprises each of the compositions of the first through the eighth sets of embodiments, wherein each of the one or more polyphosphites has a number average molecular number ($M_n$):

a) greater than or equal to 2,000 g/mol, greater than or equal to 500 g/mol, greater than or equal to 1,000 g/mol, or greater than or equal to 1,500 g/mol;
b) less than or equal to 5,000 g/mol, less than or equal to 3,500 g/mol, or less than or equal to 2,500 g/mol; or
c) in the range of from 500 to 5,000 g/mol, from 1,000 to 3,500 g/mol, or from 1,500 to 2,500 g/mol.

A tenth set of embodiments comprises each of the compositions of the first through the ninth sets of embodiments, wherein each of the one or more polyphosphites has a weight average molecular weight ($M_w$):

a) greater than or equal to 1,000 g/mol, greater than or equal to 2,000 g/mol, or greater than or equal to 3,000 g/mol;
b) less than or equal to 10,000 g/mol, less than or equal to 7,000 g/mol, or less than or equal to 5,000 g/mol; or
c) in the range of from 1,000 to 10,000 g/mol, from 2,000 to 7,000 g/mol, or from 3,000 to 5,000 g/mol.

An eleventh set of embodiments comprises each of the compositions of the first through the tenth sets of embodiments, wherein the PPA is added to a polymer in an amount effective to produce a polymer composition comprising the one or more polyphosphites in an amount:

a) greater than or equal to 400 ppm, greater than or equal to 450 ppm, greater than or equal to 500 ppm, greater than or equal to 550 ppm, greater than or equal to 600 ppm, greater than or equal to 650 ppm, greater than or equal to 700 ppm, greater than or equal to 750 ppm, greater than or equal to 800 ppm, or greater than or equal to 850 ppm;
b) less than or equal to 2,200 ppm, less than or equal to 2,100 ppm, less than or equal to 2,000 ppm, less than or equal to 1,900 ppm, less than or equal to 1,800 ppm, less than or equal to 1,700 ppm, less than or equal to 1,600 ppm, less than or equal to 1,500 ppm, less than or equal to 1,400 ppm, or less than or equal to 1,300 ppm; or
c) in the range of from 400 ppm to 2,200 ppm, from 450 ppm to 2,100 ppm, from 500 ppm to 2,000 ppm, from 550 ppm to 1,900 ppm, from 600 ppm to 1,800 ppm, from 650 ppm to 1,700 ppm, from 700 ppm to 1,600 ppm, from 750 ppm to 1,500 ppm, from 800 ppm to 1,400 ppm, or from 850 ppm to 1,300 ppm.

A twelfth set of embodiments comprises each of the compositions of the first through the eleventh sets of embodiments, wherein the polymer composition comprises an ethylene copolymer comprising units derived from ethylene and units derived from one or more $C_3$ to $C_{20}$ α-olefins, and the ethylene copolymer has density within the range from 0.905 to 0.945 g/cm$^3$ and melt index (ASTM D1238 at 190° C., 2.16 kg loading) within the range from 0.1 to 5.0 g/10 min. In further embodiments, the ethylene copolymer is metallocene-catalyzed linear low density polyethylene (mLLDPE), comprising units derived from ethylene and units derived from 1-butene, 1-hexene, or 1-octene. In yet further embodiments, the ethylene copolymer has a high load melt index (190° C., 21.6 kg) less than or equal to 80 g/10 min, less than or equal to 40, or less than or equal to 80.

A thirteenth set of embodiments comprises each of the compositions of the first through the twelfth sets of embodiments, wherein the polymer composition has been formed by a process comprising melt-blending the mixture of one or more polyamides and one or more polyphosphites and the homopolymer or copolymer so as to obtain the polymer composition having homogenously distributed mixture among the homopolymer or copolymer.

A fourteenth set of embodiments comprises each of the compositions of the first through the thirteenth sets of embodiments wherein at least a portion of the polymer processing aid is provided to the polymer composition in the form of a masterbatch comprising the polymer processing aid in a carrier resin.

In another aspect, disclosed herein is a blown film made from the polymer composition of any one of the first through the fourteenth sets of embodiments described above, wherein the film, when compared to a benchmark film, has:

i. a 1% secant modulus (MD) within ±15%, within ±10%, or within ±5% of the value (psi) of the benchmark film;
ii. a dart drop within ±15%, within ±10%, or within ±5% of the value (g) of the benchmark film; or
iii. an Elmendorf tear (MD) within ±20%, within ±15%, or within ±10% of the value (g/mil) benchmark film;
iv. a MD gloss 45° within ±15 GU, within ±10 GU, or within ±5 GU of the value (in GU) of the benchmark film, and/or MD gloss 45° greater than or equal to 40 GU or greater than or equal to 43 GU;
v. a total haze within ±15% haze, within ±10% haze, or within ±5% haze of the value (in % haze) of the benchmark film, and/or total haze less than or equal to 20% or less than or equal to 16%; or
vi. a combination thereof;

wherein the benchmark film is made using a fluoropolymer-based polymer processing aid instead of the polymer processing aid comprising the mixture of one or more polyamides and one or more polyphosphites but is otherwise identical to the film.

In another aspect, disclosed herein is a method for making a blown film. In a first set of embodiments, the method comprises blending a polyamide (PA)/polyphosphite (PPI) masterbatch with a polymer composition to obtain a polymer compound. The method further comprises forming the polymer compound into a polymer product. The PA/PPI masterbatch comprises a mixture of one or more PAs and one of more PPIs and a carrier resin. The polymer compound comprises the mixture of one or more PAs and one or more PPIs. Further, the polymer compound is substantially free of fluorine-containing compounds.

A second set of embodiments of the method comprises the limitations of the first set of embodiments of the method, wherein the polymer composition is a pre-finished polymer composition comprising reactor-grade polymer, and forming the polymer compound into the polymer product comprises coextruding and pelletizing the pre-finished polymer composition with the PA/PPI masterbatch, thereby obtaining the polymer product as polymer pellets.

A third set of embodiments of the method comprises the limitations of the first set of embodiments of the method, wherein the polymer composition is a finished polymer composition comprising polymer pellets, and forming the polymer compound into the polymer product comprises forming a polymeric article from the polymer compound, such that the polymer product is a polymeric article. In further embodiments, the polymeric article is a blown film. In further embodiments, the polymer composition comprises a $C_2$ to $C_6$ olefin homopolymer or a copolymer of two or more $C_2$ to $C_{20}$ α-olefins. In yet further embodiments, the polymer composition comprises an ethylene homopolymer or a copolymer of ethylene and one or more $C_3$ to $C_{20}$ α-olefins. In some embodiments, the polymer composition comprises: a Ziegler-Natta catalyzed copolymer of ethylene and one or more of 1-butene, 1-hexene, and 1-octene; a metallocene catalyzed copolymer of ethylene and one or more of 1-butene, 1-hexene, and 1-octene; or a combination thereof.

A fourth set of embodiments of the method comprises the limitations of any one of the first set of embodiments, the second set of embodiments, or the third set of embodiments of the method, wherein the masterbatch is added to a polymer composition in an amount effective to produce a polymer compound comprising the mixture of the one or more polyamides and the one or more polyphosphites in an amount:

a) greater than or equal to 560 ppm, greater than or equal to 680 ppm, greater than or equal to 800 ppm, greater than or equal to 920 ppm, greater than or equal to 1,040 ppm, greater than or equal to 1,160 ppm, greater than or equal to 1,280 ppm, greater than or equal to 1,400 ppm, greater than or equal to 1,520 ppm, or greater than or equal to 1,640 ppm;
b) less than or equal to 4,400 ppm, less than or equal to 4,200 ppm, less than or equal to 4,000 ppm, less than or equal to 3,800 ppm, less than or equal to 3,600 ppm, less than or equal to 3,400 ppm, less than or equal to 3,200 ppm, less than or equal to 3,000 ppm, less than or equal to 2,800 ppm, or less than or equal to 2,600 ppm; or
c) in the range of from 560 ppm to 4,400 ppm, from 680 ppm to 4,200 ppm, from 800 ppm to 4,000 ppm, from 920 ppm to 3,800 ppm, from 1,040 ppm to 3,600 ppm, from 1,160 ppm to 3,400 ppm, from 1,280 ppm to 3,200 ppm, from 1,400 ppm to 3,000 ppm, from 1,520 ppm to 2,800 ppm, or from 1,640 ppm to 2,600 ppm.

A fifth set of embodiments of the method comprises the limitations of any one of the first set through the fourth sets of embodiments of the method, wherein the mixture of the one or more polyamides and the one or more polyphosphites comprises the one or more polyamides and the one or more polyphosphites in a ratio of the weight of the one or more polyamides to weight of the one or more polyphosphites in the range of from 6:1 to 1:25, from 5:1 to 1:20, from 4:1 to 1:15, from 3:1 to 1:8, or from 2:1 to 1:3, based on the total weight of the one or more polyamides and the one or more polyphosphites.

A sixth set of embodiments of the method comprises the limitations of any one of the first through the fifth sets of embodiments of the method, wherein each one of the one or more polyamides comprises an aliphatic polyamide, an aromatic polyamide (aramid), a semi-aromatic polyamide, a high-performance polyamide, a bio-based polyamide, a polyamide copolymer, a thermoplastic elastomer polyamide, or a combination thereof. In some embodiments, the aliphatic polyamide (nylon) comprises nylon 6, nylon 6,6, nylon 12, or a combination thereof. In some embodiments, the aromatic polyamide (aramid) comprises Kevlar™ material (available from DuPont), Nomex™ material (available from DuPont, or a combination thereof. In some embodiments, the semi-aromatic polyamide comprises nylon 6T, nylon 6I, nylon MXD6, or a combination thereof. In some embodiments, the high-performance polyamide comprises nylon 4,6, nylon 9T, polyamide 12T, polyamide 10T, or a combination thereof. In some embodiments, the bio-based polyamide comprises nylon 11, nylon polyamide 610, polyamide 612, or a combination thereof. In some embodiments, the polyamide copolymer comprises nylon 6/12, nylon 6/66, or a combination thereof. In some embodiments, thermoplastic elastomer polyamides (TPE-A) comprise Pebax™ (a family of polyether block amides available from Arkema), Grilamid™ (a series of high-performance TPE polyamides available from EMS-GRIVORY), Vestamid™ E (a polyether block amide available from Evonik), Elastollan™ TPE-A (available from BASF), or Zytel™ TPE-A (available from DuPont).

A seventh set of embodiments of the method comprises the limitations of any one of the first through the sixth sets of embodiments of the method, wherein each of the one or more polyamides comprises particulate matter having a particle size:

a) greater than or equal to 2 microns, greater than or equal to 10 microns, greater than or equal to 50 microns, greater than or equal to 100 microns, or greater than or equal to 350 microns, or greater than or equal to 500 microns;
b) less than or equal to 1,500 microns, less than or equal to 1,200 microns, less than or equal to 1,000 microns, less than or equal to 900 microns, less than or equal to 800 microns, or less than or equal to 700 microns. In some embodiments, each of the one or more polyamides comprises particulate matter having a particle size in the range of from 2 to 1,500 microns, from 10 to 1,200 microns, from 50 to 1,000 microns, from 100 to 900 microns, from 350 to 800 microns, or from 500 to 700 microns; or
c) in the range of from 2 to 1,500 microns, from 10 to 1,200 microns, from 50 to 1,000 microns, from 100 to 900 microns, from 350 to 800 microns, or from 500 to 700 microns.

An eighth set of embodiments of the method comprises the limitations of any one of the first through the seventh sets of embodiments of the method, wherein each of the one or more polyamides has a low load melt index (LLMI) according to ASTM D-1238, 2.16 kg at 230° C.:

a) greater than or equal to 30 dg/min, greater than or equal to 34 dg/min, greater than or equal to 36 dg/min, or greater than or equal to 38 dg/min;

b) less than or equal to 50 dg/min, less than or equal to 46 dg/min, less than or equal to 44 dg/min, or less than or equal to 42 dg/min; or c) in the range of from 30 dg/min to 50 dg/min, from 34 dg/min to 46 dg/min, from 36 dg/min to 44 dg/min, or from 38 dg/min to 42 dg/min.

A ninth set of embodiments of the method comprises the limitations of any one of the first through the eighth sets of embodiments of the method, wherein each of the one or more polyamides has a medium load melt index (MLMI) according to ASTM D-1238, 5 kg at 230° C.:

a) greater than or equal to 110 dg/min, greater than or equal to 115 dg/min, to 46 dg/min, greater than or equal to 120 dg/min, or greater than or equal to 125 dg/min;

b) less than or equal to 160 dg/min, less than or equal to 150 dg/min, less than or equal to 140 dg/min, or less than or equal to 135 dg/min; or c) in the range of from 110 dg/min to 160 dg/min, from 115 dg/min to 150 dg/min, from 120 dg/min to 140 dg/min, or from 125 dg/min to 135 dg/min.

A tenth set of embodiments of the method comprises the limitations of any one of the first through the ninth sets of embodiments of the method, wherein the masterbatch is added to a polymer composition in an amount effective to produce a polymer compound comprising the one or more polyamides in an amount:

a) greater than or equal to 160 ppm, greater than or equal to 230 ppm, greater than or equal to 300 ppm, greater than or equal to 370 ppm, greater than or equal to 440 ppm, greater than or equal to 510 ppm, greater than or equal to 580 ppm, greater than or equal to 650 ppm, greater than or equal to 720 ppm. or greater than or equal to 790 ppm;

b) less than or equal to 2,200 ppm, less than or equal to 2,100 ppm, less than or equal to 2,000 ppm, less than or equal to 1,900 ppm, less than or equal to 1,800 ppm, less than or equal to 1,700 ppm, less than or equal to 1,600 ppm, less than or equal to 1,500 ppm, less than or equal to 1,400 ppm, or less than or equal to 1,300 ppm; or c) in the range of from 160 ppm to 2,200 ppm, from 230 ppm to 2,100 ppm, from 300 ppm to 2,000 ppm, from 370 ppm to 1,900 ppm, from 440 ppm to 1,800 ppm, from 510 ppm to 1,700 ppm, from 580 ppm to 1,600 ppm, from 650 ppm to 1,500 ppm, from 720 ppm to 1,400 ppm, or from 790 ppm to 1,300 ppm.

An eleventh set of embodiments of the method comprises the limitations of any one of the first through the tenth sets of embodiments of the method, wherein each of the one or a more polyphosphites is an organic polyphosphite. In some embodiments, each of the one or more polyphosphites comprises an alkyl polyphosphite, an aryl polyphosphite, a cyclic polyphosphite, an oligomeric polyphosphite, a mixed polyphosphite, a high-performance polyphosphite, or a combination thereof. In some embodiments, the one or more polyphosphites comprises a poly(tris-aryl phosphite) polymeric structure. In some embodiments, alkyl polyphosphite polymers comprise poly(tris(2-ethylhexyl) phosphite), poly (tris(dodecyl) phosphite), a poly(tris(butyl) phosphite), or a combination thereof. In some embodiments, aryl polyphosphite polymers, comprise poly(triphenyl phosphite), poly (tris(nonylphenyl) phosphite), poly(diphenyl isodecyl phosphite), or a combination thereof. In some embodiments, cyclic polyphosphite polymers comprise poly(2,4,6-tri-tert-butylphenyl phosphite), poly(tetramethyl bisphenol A phosphite), poly(butylated cyclic phosphite), or a combination thereof. In some embodiments, oligomeric polyphosphite polymers, comprise poly(oligomeric triphenyl phosphite), oligomeric poly(alkylphenyl phosphite), or a combination thereof. In some embodiments, mixed polyphosphite polymers combine the benefits of both alkyl and aryl groups, such as but not limited to poly(bis(2,4-di-tert-butylphenyl)-ethyl phosphite), poly(alkylphenyl phosphite), poly(bis(phenyl/alkyl) phosphite), or a combination thereof. In some embodiments, high-performance phosphite polymers comprise poly(Ultranox™ 626) (available from Addivant), poly (Irgafos™ 168) (available from BASF), poly(Doverphos™ S-9228) (available from Dover Chemical Corporation), or a combination thereof.

A twelfth set of embodiments of the method comprises the limitations of any one of the first through the tenth sets of embodiments of the method, wherein each of the one or more polyphosphites is a copolymer of phosphite monomers having two aryl groups, phosphite monomers having three aryl groups, or a combination thereof, or each of the one or more polyphosphites is a copolymer of phosphite monomers having two phenyl groups, phosphite monomers having three phenyl groups, or a combination thereof, and aliphatic alcohols comprising at least one monohydric alcohol and at least one of a dihydric alcohol, trihydric alcohol, a polyhydric alcohol, or a combination thereof. In some embodiments, at least one of the one more polyphosphites is the reaction product of triphenyl phosphite monomers (A) and aliphatic alcohol monomers (B). The aliphatic alcohols can comprise monomers containing only one alcohol group (B1) or monomers containing two alcohol groups (B2). Further detail related to these polyphosphite compositions can be found in U.S. Pat. No. 11,472,928, the contents of which of fully incorporated by reference herein.

A thirteenth set of embodiments of the method comprises the limitations of any one of the first through the tenth sets of embodiments of the method, wherein least one of the one or more polyphosphites are described by Formula (I), Formula (II), Formula (III), or Formula (IV) (described above). In some embodiments, the one of the one or more polyphosphites comprise two or more polyphosphites, wherein each of the two is described by a different one of Formulas (I)-(IV), above. In some embodiments, the one of the one or more polyphosphites comprise three or more polyphosphites, wherein each of the three is described by a different one of Formulas (I)-(IV), above. In some embodiments, the one of the one or more polyphosphites comprise four or more polyphosphites, wherein each of the four is described by a different one of Formulas (I)-(IV), above.

A fourteenth set of embodiments of the method comprises the limitations of any one of the first through the thirteenth sets of embodiments of the method, wherein each of the one or more polyphosphites has a number average molecular number ($M_n$):

a) greater than or equal to 500 g/mol, greater than or equal to 1,000 g/mol, or greater than or equal to 1,500 g/mol;

b) less than or equal to 5,000 g/mol, less than or equal to 3,500 g/mol, or less than or equal to 2,500 g/mol; or c) in the range of from 500 to 5,000 g/mol, from 1,000 to 3,500 g/mol, or from 1,500 to 2,500 g/mol.

A fifteenth set of embodiments of the method comprises the limitations of any one of the first through the fourteenth sets of embodiments of the method, wherein each of the one or more polyphosphites has a weight average molecular weight ($M_w$):

a) greater than or equal to 1,000 g/mol, greater than or equal to 2,000 g/mol, or greater than or equal to 3,000 g/mol;

b) less than or equal to 10,000 g/mol, less than or equal to 7,000 g/mol, or less than or equal to 5,000 g/mol; or c) in the range of from 1,000 to 10,000 g/mol, from 2,000 to 7,000 g/mol, or from 3,000 to 5,000 g/mol.

A sixteenth set of embodiments of the method comprises the limitations of any one of the first through the fifteenth sets of embodiments of the method, wherein the masterbatch is added to a polymer composition in an amount effective to produce a polymer compound comprising the one or more polyphosphites in an amount:

a) greater than or equal to 400 ppm, greater than or equal to 450 ppm, greater than or equal to 500 ppm, greater than or equal to 550 ppm, greater than or equal to 600 ppm, greater than or equal to 650 ppm, greater than or equal to 700 ppm, greater than or equal to 750 ppm, greater than or equal to 800 ppm, or greater than or equal to 850 ppm;

b) less than or equal to 2,200 ppm, less than or equal to 2,100 ppm, less than or equal to 2,000 ppm, less than or equal to 1,900 ppm, less than or equal to 1,800 ppm, less than or equal to 1,700 ppm, less than or equal to 1,600 ppm, less than or equal to 1,500 ppm, less than or equal to 1,400 ppm, or less than or equal to 1,300 ppm; or c) in the range of from 400 ppm to 2,200 ppm, from 450 ppm to 2,100 ppm, from 500 ppm to 2,000 ppm, from 550 ppm to 1,900 ppm, from 600 ppm to 1,800 ppm, from 650 ppm to 1,700 ppm, from 700 ppm to 1,600 ppm, from 750 ppm to 1,500 ppm, from 800 ppm to 1,400 ppm, or from 850 ppm to 1,300 ppm.

A seventeenth set of embodiments of the method comprises the limitations of any one of the first through the sixteenth sets of embodiments of the method, wherein the polymer composition comprises an ethylene copolymer comprising units derived from ethylene and units derived from one or more $C_3$ to $C_{20}$ α-olefins, and the ethylene copolymer has density within the range from 0.905 to 0.945 g/cm$^3$ and melt index (ASTM D1238 at 190° C., 2.16 kg loading) within the range from 0.1 to 5.0 g/10 min. In further embodiments, the ethylene copolymer is metallocene-catalyzed linear low density polyethylene (mLLDPE), comprising units derived from ethylene and units derived from 1-butene, 1-hexene, or 1-octene. In yet further embodiments, the ethylene copolymer has a high load melt index (190° C., 21.6 kg) less than or equal to 80 g/10 min, less than or equal to 40, or less than or equal to 80.

An eighteenth set of embodiments of the method comprises the limitations of any one of the first through the seventeenth sets of embodiments of the method, wherein the polymer compound has been formed by a process comprising melt-blending the mixture of one or more polyamides and one or more polyphosphites and the homopolymer or copolymer so as to obtain the polymer compound having homogenously distributed mixture among the homopolymer or copolymer.

A nineteenth set of embodiments of the method comprises the limitations of any one of the first through the eighteenth sets of embodiments of the method, wherein the PA/PPI masterbatch comprises from 1 to 50 wt % or from 1 to 30 wt % of the mixture of one or more polyamides and one or more polyphosphites, based on the weight of the PA/PPI masterbatch.

A twentieth set of embodiments of the method comprises the limitations of any one of the first through the nineteenth sets of embodiments of the method, wherein the carrier resin is selected from the group consisting of mLLDPE, ZN-LLDPE, LDPE, and combinations thereof.

A twenty-first set of embodiments of the method comprises the limitations of any one of the first through the twentieth sets of embodiments of the method, wherein the carrier resin has a melt index (MI) of at least 0.8 g/10 min (190° C., 2.16 kg loading); wherein in further embodiments, the carrier resin has a melt index (MI) in the range of from 0.8 g/10 min to 4.0 g/10 min.

A twenty-second set of embodiments of the method comprises the limitations of any one of the first through the twenty-first sets of embodiments of the method, wherein the PA/PPI masterbatch comprises one or more additional additives.

In another aspect, disclosed herein is a PPA masterbatch. In a first set of embodiments, the PPA masterbatch comprises a mixture of one or more polyamides (PAs) and one or more polyphosphites (PPIs), a carrier resin, and optionally, one or more non-PPA additives. Further, the PPA masterbatch is substantially free of fluorine-containing compounds.

In some embodiments, the PPA masterbatch is further characterized by one or more of:

a) the PPA masterbatch comprises from 1 to 50 wt % or from 1 to 30 wt % of the mixture of one or more polyamides and one or more polyphosphites, based on the weight of the PPA masterbatch;

b) the weight ratio of the one or more polyamides to the one or more polyphosphites is in the range of from 6:1 to 1:25, from 5:1 to 1:20, from 4:1 to 1:15, from 3:1 to 1:8, or from 2:1 to 1:3;

c) each one of the one or more polyamides comprises an aliphatic polyamide, an aromatic polyamide (aramid), a semi-aromatic polyamide, a high-performance polyamide, a bio-based polyamide, a polyamide copolymer, a thermoplastic elastomer polyamide, or a combination thereof; wherein in further embodiments:

i) the aliphatic polyamide (nylon) comprises nylon 6, nylon 6,6, nylon 12, or a combination thereof;

ii) the aromatic polyamide (aramid) comprises Kevlar™ material (available from DuPont), Nomex™ material (available from DuPont, or a combination thereof;

iii) the semi-aromatic polyamide comprises nylon 6T, nylon 6I, nylon MXD6, or a combination thereof;

iv) the high-performance polyamide comprises nylon 4,6, nylon 9T, polyamide 12T, polyamide 10T, or a combination thereof;

v) the bio-based polyamide comprises nylon 11, nylon polyamide 610, polyamide 612, or a combination thereof;

vi) the polyamide copolymer comprises nylon 6/12, nylon 6/66, or a combination thereof; and/or vii) the thermoplastic elastomer polyamides (TPE-A) comprise Pebax™ (a family of polyether block amides available from Arkema), Grilamid™ (a series of high-performance TPE polyamides available from EMS-GRIVORY), Vestamid™ E (a polyether block amide available from Evonik), Elastollan™ TPE-A (available from BASF), or Zytel™ TPE-A (available from DuPont);

d) each of the one or more polyamides comprises particulate matter having a particle size:

i) greater than or equal to 2 microns, greater than or equal to 10 microns, greater than or equal to 50 microns, greater than or equal to 100 microns, or greater than or equal to 350 microns, or greater than or equal to 500 microns;

ii) less than or equal to 1,500 microns, less than or equal to 1,200 microns, less than or equal to 1,000 microns, less than or equal to 900 microns, less than or equal to 800 microns, or less than or equal to 700 microns; or iii) in the range of from 2 to 1,500 microns, from 10 to 1,200 microns, from 50 to 1,000 microns, from 100 to 900 microns, from 350 to 800 microns, or from 500 to 700 microns;

e) each of the one or more polyamides has a low load melt index (LLMI) according to ASTM D-1238, 2.16 kg at 230° C.:

i) greater than or equal to 30 dg/min, greater than or equal to 34 dg/min, greater than or equal to 36 dg/min, or greater than or equal to 38 dg/min;

ii) less than or equal to 50 dg/min, less than or equal to 46 dg/min, less than or equal to 44 dg/min, or less than or equal to 42 dg/min; or iii) in the range of from 30 dg/min to 50 dg/min, from 34 dg/min to 46 dg/min, from 36 dg/min to 44 dg/min, or from 38 dg/min to 42 dg/min;

f) each of the one or more polyamides has a medium load melt index (MLMI) according to ASTM D-1238, 5 kg at 230° C.:

i) greater than or equal to 110 dg/min, greater than or equal to 115 dg/min, to 46 dg/min, greater than or equal to 120 dg/min, or greater than or equal to 125 dg/min;

ii) less than or equal to 160 dg/min, less than or equal to 150 dg/min, less than or equal to 140 dg/min, or less than or equal to 135 dg/min; or iii) in the range of from 110 dg/min to 160 dg/min, from 115 dg/min to 150 dg/min, from 120 dg/min to 140 dg/min, or from 125 dg/min to 135 dg/min.

g) each of the one or more polyphosphites is an organic polyphosphite;

h) each of the one or more polyphosphites comprises an alkyl polyphosphite, an aryl polyphosphite, a cyclic polyphosphite, an oligomeric polyphosphite, a mixed polyphosphite, a high-performance polyphosphite, or a combination thereof; wherein in further embodiments:

i) the one or more polyphosphites comprises a poly (tris-aryl phosphite) polymeric structure;

ii) the alkyl polyphosphite polymers comprise poly(tris (2-ethylhexyl) phosphite), poly(tris(dodecyl) phosphite), a poly(tris(butyl) phosphite), or a combination thereof;

iii) the aryl polyphosphite polymers, comprise poly (triphenyl phosphite), poly(tris(nonylphenyl) phosphite), poly(diphenyl isodecyl phosphite), or a combination thereof iv) the cyclic polyphosphite polymers comprise poly (2,4,6-tri-tert-butylphenyl phosphite), poly(tetramethyl bisphenol A phosphite), poly(butylated cyclic phosphite), or a combination thereof;

v) the oligomeric polyphosphite polymers, comprise poly(oligomeric triphenyl phosphite), oligomeric poly(alkylphenyl phosphite), or a combination thereof;

vi) the mixed polyphosphite polymers combine the benefits of both alkyl and aryl groups, such as but not limited to poly(bis(2,4-di-tert-butylphenyl)-ethyl phosphite), poly(alkylphenyl phosphite), poly(bis (phenyl/alkyl) phosphite), or a combination thereof.

In some embodiments, high-performance phosphite polymers comprise poly(Ultranox™ 626) (available from Addivant), poly(Irgafos™ 168) (available from BASF), poly(Doverphos™ S-9228) (available from Dover Chemical Corporation), or a combination thereof;

i) each of the one or more polyphosphites is a copolymer of phosphite monomers having two phenyl groups, phosphite monomers having three phenyl groups, or a combination thereof, and aliphatic alcohols comprising at least one monohydric alcohol and at least one of a dihydric alcohol, trihydric alcohol, a polyhydric alcohol, or a combination thereof;

j) at least one of the one or more polyphosphites are described by Formula (I), Formula (II), Formula (III), or Formula (IV) (described above); wherein in further embodiments, the one of the one or more polyphosphites comprise two or more polyphosphites, wherein each of the two is described by a different one of Formulas (I)-(IV), above; wherein in yet further embodiments, the one of the one or more polyphosphites comprise three or more polyphosphites, wherein each of the three is described by a different one of Formulas (I)-(IV), above; wherein in even further embodiments, the one of the one or more polyphosphites comprise four or more polyphosphites, wherein each of the four is described by a different one of Formulas (I)-(IV), above;

k) each of the one or more polyphosphites has a number average molecular number ($M_n$):

i) greater than or equal to 2,000 g/mol, greater than or equal to 500 g/mol, greater than or equal to 1,000 g/mol, or greater than or equal to 1,500 g/mol;

ii) less than or equal to 5,000 g/mol, less than or equal to 3,500 g/mol, or less than or equal to 2,500 g/mol; or iii) in the range of from 500 to 5,000 g/mol, from 1,000 to 3,500 g/mol, or from 1,500 to 2,500 g/mol;

l) each of the one or more polyphosphites has a weight average molecular weight ($M_w$):

i) greater than or equal to 1,000 g/mol, greater than or equal to 2,000 g/mol, or greater than or equal to 3,000 g/mol;

ii) less than or equal to 10,000 g/mol, less than or equal to 7,000 g/mol, or less than or equal to 5,000 g/mol; or iii) in the range of from 1,000 to 10,000 g/mol, from 2,000 to 7,000 g/mol, or from 3,000 to 5,000 g/mol;

m) the carrier resin has an MI of at least 0.8 g/10 min (190° C., 2.16 kg) or within the range from 0.8 to 4.0 g/10 min (190° C., 2.16 kg);

n) the carrier resin is selected from a gas phase-polymerized linear low density polyethylene (LLDPE), a high-pressure free radical-polymerized low density polyethylene (LDPE), or a combination thereof;

o) the carrier resin is Ziegler Natta-catalyzed or metallocene-catalyzed LLDPE having melt index ($I_2$, determined at 190° C., 2.16 kg loading) within the range from 1.5 to 5 g/10 min and density within the range from 0.910 to 0.935 g/cm$^3$;

p) the one or more non-PPA additives are selected from the group consisting of anti-block agents, anti-cling additives, anti-static agents, fillers, heat stabilizers, primary antioxidants, release agents, secondary antioxidants, slip agents, tackifiers, UV stabilizers, waxes, and combinations thereof; wherein in further embodiments:

i) UV stabilizers are one or more selected from the group consisting of: hindered amine light stabilizers, triazines, hydroxyphenyl triazines, benzotriazoles, hydroxyphenyl benzotriazoles, benzophenones, hydroxybenzophenones, cyanoacrylates, oxanilides, organo-nickel compounds, and combinations thereof;

ii) slip agents are one or more selected from the group consisting of: oleamide, erucamide, stearamide, behenamide, oleyl palmitamide, stearyl erucamide, ethylene-bis-stearamide, ethylene-bis-oleamide, and combinations thereof;

iii) primary antioxidants are one or more selected from the group consisting of: hindered alkyl phenols, Vitamin E, and hydroxylamines;

iv) secondary antioxidants are one or more selected from the group consisting of: monophosphites, disphosphites, and combinations thereof; and/or v) antiblock agents are one or more selected from the group consisting of: talc, crystalline and amorphous (fumed) silica, nepheline syenite, diatomaceous earth, clay (e.g., kaolin clay), zeolites, and combinations thereof; and q) the one or more non-PPA additives are collectively present in the masterbatch in an amount between 200 ppm and 5,000 ppm, on the basis of the mass of the masterbatch.

In another aspect, a process for making a polymeric film is disclosed, wherein a polymer composition has an initial content of PPA to make a film having a first content of PPA, then adding a PPA masterbatch to the polymer composition to produce a film having a second content of PPA. In a first set of embodiments, the process comprises:

a) for a first time interval, continuously extruding a polymer composition through an extruder at extrusion conditions to form the polymeric film;

b) at a first time endpoint during the continuous extrusion, developing one or more melt fractures in the polymeric film;

c) in response to developing the one or more melt fractures in the film, continuously feeding a PPA masterbatch to the extruder during a second time interval after the first time interval; and d) obtaining the polymeric film during at least the second time interval;

wherein:

the PPA masterbatch comprises:

i. from 1 to 50 wt % or from 1 to 30 wt % of a mixture of one or more polyamides (PAs) and one or more polyphosphites (PPIs), based on the weight of the masterbatch;

ii. a carrier resin; and iii. optionally, one or more non-PPA additives;

no PPA additives other than the mixture of one or more PAs and one or more PPIs are introduced to the extruder during the extruding; and the polymeric film is substantially free of fluorine and fluorine-containing compounds.

A second set of embodiments, any of the first set of embodiments further characterized by one or more of:

a) the carrier resin has an MI of at least 0.8 g/10 min (190° C., 2.16 kg) or within the range from 0.8 to 4.0 g/10 min (190° C., 2.16 kg);

b) the polymer composition is a linear low density polyethylene (LLDPE) and the carrier resin is the same or a different LLDPE;

c) each one of the one or more polyamides comprises an aliphatic polyamide, an aromatic polyamide (aramid), a semi-aromatic polyamide, a high-performance polyamide, a bio-based polyamide, a polyamide copolymer, a thermoplastic elastomer polyamide, or a combination thereof; wherein in further embodiments:

i) the aliphatic polyamide (nylon) comprises nylon 6, nylon 6,6, nylon 12, or a combination thereof;

ii) the aromatic polyamide (aramid) comprises Kevlar™ material (available from DuPont), Nomex™ material (available from DuPont, or a combination thereof;

iii) the semi-aromatic polyamide comprises nylon 6T, nylon 6I, nylon MXD6, or a combination thereof;

iv) the high-performance polyamide comprises nylon 4,6, nylon 9T, polyamide 12T, polyamide 10T, or a combination thereof;

v) the bio-based polyamide comprises nylon 11, nylon polyamide 610, polyamide 612, or a combination thereof;

vi) the polyamide copolymer comprises nylon 6/12, nylon 6/66, or a combination thereof; and/or vii) the thermoplastic elastomer polyamides (TPE-A) comprise Pebax™ (a family of polyether block amides available from Arkema), Grilamid™ (a series of high-performance TPE polyamides available from EMS-GRIVORY), Vestamid™ E (a polyether block amide available from Evonik), Elastollan™ TPE-A (available from BASF), or Zytel™ TPE-A (available from DuPont);

d) each of the one or more polyamides comprises particulate matter having a particle size:

i) greater than or equal to 2 microns, greater than or equal to 10 microns, greater than or equal to 50 microns, greater than or equal to 100 microns, or greater than or equal to 350 microns, or greater than or equal to 500 microns;

ii) less than or equal to 1,500 microns, less than or equal to 1,200 microns, less than or equal to 1,000 microns, less than or equal to 900 microns, less than or equal to 800 microns, or less than or equal to 700 microns. In some embodiments, each of the one or more polyamides comprises particulate matter having a particle size in the range of from 2 to 1,500 microns, from 10 to 1,200 microns, from 50 to 1,000 microns, from 100 to 900 microns, from 350 to 800 microns, or from 500 to 700 microns; or iii) in the range of from 2 to 1,500 microns, from 10 to 1,200 microns, from 50 to 1,000 microns, from 100 to 900 microns, from 350 to 800 microns, or from 500 to 700 microns.

e) each of the one or more polyamides has a low load melt index (LLMI) according to ASTM D-1238, 2.16 kg at 230° C.:

i) greater than or equal to 30 dg/min, greater than or equal to 34 dg/min, greater than or equal to 36 dg/min, or greater than or equal to 38 dg/min;

ii) less than or equal to 50 dg/min, less than or equal to 46 dg/min, less than or equal to 44 dg/min, or less than or equal to 42 dg/min; or iii) in the range of from 30 dg/min to 50 dg/min, from 34 dg/min to 46 dg/min, from 36 dg/min to 44 dg/min, or from 38 dg/min to 42 dg/min;

f) each of the one or more polyamides has a medium load melt index (MLMI) according to ASTM D-1238, 5 kg at 230° C.:

i) greater than or equal to 110 dg/min, greater than or equal to 115 dg/min, to 46 dg/min, greater than or equal to 120 dg/min, or greater than or equal to 125 dg/min;

ii) less than or equal to 160 dg/min, less than or equal to 150 dg/min, less than or equal to 140 dg/min, or less than or equal to 135 dg/min; or iii) in the range of from 110 dg/min to 160 dg/min, from 115 dg/min to 150 dg/min, from 120 dg/min to 140 dg/min, or from 125 dg/min to 135 dg/min.

g) each of the one or more polyphosphites is an organic polyphosphite;

h) each of the one or more polyphosphites comprises an alkyl polyphosphite, an aryl polyphosphite, a cyclic polyphosphite, an oligomeric polyphosphite, a mixed polyphosphite, a high-performance polyphosphite, or a combination thereof; wherein in further embodiments:

i) the one or more polyphosphites comprises a poly (tris-aryl phosphite) polymeric structure;

ii) the alkyl polyphosphite polymers comprise poly(tris (2-ethylhexyl) phosphite), poly(tris(dodecyl) phosphite), a poly(tris(butyl) phosphite), or a combination thereof;

iii) the aryl polyphosphite polymers, comprise poly (triphenyl phosphite), poly(tris(nonylphenyl) phosphite), poly(diphenyl isodecyl phosphite), or a combination thereof iv) the cyclic polyphosphite polymers comprise poly (2,4,6-tri-tert-butylphenyl phosphite), poly(tetramethyl bisphenol A phosphite), poly(butylated cyclic phosphite), or a combination thereof;

v) the oligomeric polyphosphite polymers, comprise poly(oligomeric triphenyl phosphite), oligomeric poly(alkylphenyl phosphite), or a combination thereof;

vi) the mixed polyphosphite polymers combine the benefits of both alkyl and aryl groups, such as but not limited to poly(bis(2,4-di-tert-butylphenyl)-ethyl phosphite), poly(alkylphenyl phosphite), poly(bis (phenyl/alkyl) phosphite), or a combination thereof. In some embodiments, high-performance phosphite polymers comprise poly(Ultranox™ 626) (available from Addivant), poly(Irgafos™ 168) (available from BASF), poly(Doverphos™ S-9228) (available from Dover Chemical Corporation), or a combination thereof;

i) each of the one or more polyphosphites is a copolymer of phosphite monomers having two aryl groups, phosphite monomers having three aryl groups, or a combination thereof, or each of the one or more polyphosphites is a copolymer of phosphite monomers having two phenyl groups, phosphite monomers having three phenyl groups, or a combination thereof, and aliphatic alcohols comprising at least one monohydric alcohol and at least one of a dihydric alcohol, trihydric alcohol, a polyhydric alcohol, or a combination thereof;

j) at least one of the one or more polyphosphites are described by Formula (I), Formula (II), Formula (III), or Formula (IV) (described above); wherein in further embodiments, the one of the one or more polyphosphites comprise two or more polyphosphites, wherein each of the two is described by a different one of Formulas (I)-(IV), above; wherein in yet further embodiments, the one of the one or more polyphosphites comprise three or more polyphosphites, wherein each of the three is described by a different one of Formulas (I)-(IV), above; wherein in even further embodiments, the one of the one or more polyphosphites comprise four or more polyphosphites, wherein each of the four is described by a different one of Formulas (I)-(IV), above;

k) each of the one or more polyphosphites has a number average molecular number ($M_n$):

i) greater than or equal to 500 g/mol, greater than or equal to 1,000 g/mol, or greater than or equal to 1,500 g/mol;

ii) less than or equal to 5,000 g/mol, less than or equal to 3,500 g/mol, or less than or equal to 2,500 g/mol; or iii) in the range of from 500 to 5,000 g/mol, from 1,000 to 3,500 g/mol, or from 1,500 to 2,500 g/mol;

l) each of the one or more polyphosphites has a weight average molecular weight ($M_w$):

i) greater than or equal to 1,000 g/mol, greater than or equal to 2,000 g/mol, or greater than or equal to 3,000 g/mol;

ii) less than or equal to 10,000 g/mol, less than or equal to 7,000 g/mol, or less than or equal to 5,000 g/mol; or iii) in the range of from 1,000 to 10,000 g/mol, from 2,000 to 7,000 g/mol, or from 3,000 to 5,000 g/mol;

m) the extrusion conditions include:

i) a die gap of 60 mil or less;

ii) a die factor of 15 lbs/(hr*in die) or greater;

iii) an Extrusion Processing Factor (EPF=100×[die factor]/[die gap]$^2$) of 0.4 or greater, wherein die factor is in lbs/(hr*in die) and die gap is in mil; or iv) a combination thereof.

In a third set of embodiments, the process of any of the first or second sets of embodiments is further characterized by the following:

a) the polymer composition comprises the mixture of one or more PAs and one or more PPIs in an amount in the range of from 350 ppm to 2,600 ppm, from 400 ppm to 2,500 ppm, from 500 ppm to 2,400 ppm, from 550 ppm to 2,300 ppm, from 600 ppm to 2,200 ppm, from 700 ppm to 2,000 ppm, from 800 ppm to 1,900 ppm, from 850 ppm to 1,800 ppm, from 900 ppm to 1,700 ppm, or from 1,000 ppm to 1,600 ppm, based on the weight of the polymer composition; and b) the PPA masterbatch is added such that the polymeric film obtained during the second time interval comprises the mixture of one or more PAs and one or more PPIs in an amount in the range of from 560 ppm to 4,400 ppm, from 680 ppm to 4,200 ppm, from 800 ppm to 4,000 ppm, from 920 ppm to 3,800 ppm, from 1,040 ppm to 3,600 ppm, from 1,160 ppm to 3,400 ppm, from 1,280 ppm to 3,200 ppm, from 1,400 ppm to 3,000 ppm, from 1,520 ppm to 2,800 ppm, or from 1,640 ppm to 2,600 ppm, based on the weight of the polymeric film;

wherein:

the ratio of the amount of the mixture of one or more PAs and one or more PPIs in the polymer film to the amount of the mixture of one or more PAs and one or more PPIs in the polymer composition is:

i) greater than or equal to 1.2, greater than or equal to 1.4, greater than or equal to 1.6, or greater than or equal to 1.8;

ii) less than or equal to 3.0, less than or equal to 2.8, less than or equal to 2.6, less than or equal to 2.4, or less than or equal to 2.2; or iii) in the range of from 1.2 to 3.0, from 1.4 to 2.8, from 1.6 to 2.6, or from 1.8 to 2.4.

In a fourth set of embodiments, the process of any of the third set of embodiments is further characterized by one or more of the following:

a) the one or more polyamides is present in the polymer composition in an amount in the range of from 80 ppm to 1,100 ppm, from 115 ppm to 1,050 ppm, from 150 ppm to 1,000 ppm, from 185 ppm to 950 ppm, from 220 ppm to 900 ppm, from 255 ppm to 850 ppm, from 290 ppm to 800 ppm, from 325 ppm to 750 ppm, from 360 ppm to 700 ppm, or from 395 ppm to 650 ppm;
b) the one or more polyphosphites is present in the polymer composition in an amount in the range of from 200 ppm to 1,100 ppm, from 225 ppm to 1,050 ppm, from 250 ppm to 1,000 ppm, from 275 ppm to 950 ppm, from 300 ppm to 900 ppm, from 325 ppm to 850 ppm, from 350 ppm to 800 ppm, from 375 ppm to 750 ppm, from 400 ppm to 700 ppm, or from 425 ppm to 650 ppm;
c) a weight ratio of the one or more polyamides to the one or more polyphosphites in the polymer composition is in the range of from 6:1 to 1:25, from 5:1 to 1:20, from 4:1 to 1:15, from 3:1 to 1:8, or from 2:1 to 1:3;
d) the one or more polyamides is present in the polymeric film in an amount in the range of from 160 ppm to 2,200 ppm, from 230 ppm to 2,100 ppm, from 300 ppm to 2,000 ppm, from 370 ppm to 1,900 ppm, from 440 ppm to 1,800 ppm, from 510 ppm to 1,700 ppm, from 580 ppm to 1,600 ppm, from 650 ppm to 1,500 ppm, from 720 ppm to 1,400 ppm, or from 790 ppm to 1,300 ppm;
e) the one or more polyphosphites is present in the polymeric film in an amount in the range of from 400 ppm to 2,200 ppm, from 450 ppm to 2,100 ppm, from 500 ppm to 2,000 ppm, from 550 ppm to 1,900 ppm, from 600 ppm to 1,800 ppm, from 650 ppm to 1,700 ppm, from 700 ppm to 1,600 ppm, from 750 ppm to 1,500 ppm, from 800 ppm to 1,400 ppm, or from 850 ppm to 1,300 ppm; or
f) a weight ratio of the one or more polyamides to the one or more polyphosphites in the polymeric film is in the range of from 6:1 to 1:25, from 5:1 to 1:20, from 4:1 to 1:15, from 3:1 to 1:8, or from 2:1 to 1:3.

In a fifth set of embodiments, the process of any of the first through fourth sets of embodiments is further characterized by one or more of the following:

a) 2 to 6 wt % of PPA masterbatch is added, on the basis of mass of the polymeric film;
b) the PPA masterbatch comprises 1 to 5 wt % of the mixture of one or more PAs and one or more PPIs, on basis of mass of the masterbatch;
c) the one or more non-PPA additives are selected from the group consisting of: UV stabilizers, slip agents, primary antioxidants, secondary antioxidants, and anti-block agents;
d) the carrier resin is Ziegler Natta-catalyzed LLDPE, a metallocene-catalyzed LLDPE, or a combination thereof, having one or more of the following properties: (i) melt index ($I_2$, determined at 190° C., 2.16 kg loading) within the range from 1.5 to 5 g/10 min; (ii) molecular weight distribution ($M_w/M_n$) of 3.5 or greater; and (iii) density within the range from 0.910 to 0.935 g/cm$^3$; or
e) the polymer composition is metallocene-catalyzed LLDPE copolymer of ethylene and a $C_3$ to $C_{12}$ comonomer, and has one or more of the following properties: melt index ($I_2$, determined at 190° C., 2.16 kg loading) within the range from 0.1 to 1.5 g/10 min; density within the range from 0.905 to 0.945 g/cm$^3$; and melt index ratio (MIR) within the range from 10 to 85.

The presently disclosed compositions, methods to produce such compositions, films, and processes for producing such films are exemplified with respect to the examples below. These examples are included to demonstrate embodiments of the appended claims. However, these are exemplary only, and the invention can be broadly applied to embodiments not demonstrated in the examples. Those of skill in the art should appreciate that many changes can be made in the specific embodiments which are disclosed and still obtain a like or similar result without departing from the spirit and scope of the disclosure herein. In no way should the following examples be read to limit, or to define, the scope of the appended claims.

EXAMPLES

The following examples are included to demonstrate embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Additives

Table 1 shows the PPA compositions that were tested. Loading levels and the polyethylene grades with which they blended are documented in the examples below.

TABLE 1

| Label | Additive composition | PPA grade | Available from |
|---|---|---|---|
| F | Blend of polyethylene glycol (PEG) with a fluoroelastomeric copolymer | Dynamar ™ FX5929M | 3M, St. Paul, Minnesota (Headquarters) |
| O1 | Polyamide-12 | Orgasol ™ EXD NAT1 | Arkema USA, King of Prussia, Pennsylvania |
| D1 | Polyphosphite | Doverphos ™ LGP-12 | Dover Chemical Corp., marketed by supplier as a PPA |
| D1O1 | Polyamide/polyphosphite blend | O1/D1 blend | Internal blend |
| ODMB | (Polyamide/polyphosphite blend) blended with carrier resin | O1/D1 blended with PE8 - I part by wt PPA to 1 part by wt PE1 | Internal blend |
| IN1 | Polycaprolactone, 50,000 MW | Capa ™ 6500D | Ingevity Corp., North Charleston, South Carolina |
| E1 | PEG, 8000 MW | Pluriol ™ E8000 | BASF, Beaumont, Texas |

Polyethylenes

Table 2 lists the various polyethylene base resins used in the formulation in the examples below. PE1-PE7 are all metallocene ethylene-hexene LLDPEs. PE8 is a Ziegler-Natta-catalyzed LLDPE. All commercial grade polyethylenes are available from ExxonMobil Chemical Company, Baytown, Texas.

TABLE 2

| Label | Commercial grade | Dens. (g/cc) | MI [1] (dg/min) | MIR [2] | Phenolic. primary. antiox.[3] (ppm) | Phosphitic. secondary anitox.[4] (ppm) | Slip agent[5] (ppm) | Anti-block[6] (ppm) |
|---|---|---|---|---|---|---|---|---|
| PE1 | Enable ™ 4002MC | 0.940 | 0.2 | 70 | 500 | 1,000 | — | — |
| PE2 | Exceed ™ 1018MA | 0.918 | 1.0 | 16 | 500 | 1,000 | — | — |
| PE3 | Exceed ™ 1018MK | 0.918 | 1.0 | 16 | 500 | 1,000 | 1,000 | 5,000 |
| PE4 | Exceed ™ XP8656ML | 0.916 | 0.5 | 30 | 600 | 1,200 | — | — |
| PE5 | Exceed ™ S9272ML | 0.920 | 0.8 | 30 | 600 | 1,200 | — | — |
| PE6 | Enable ™ 2005MC | 0.920 | 0.5 | 40 | 500 | 1,000 | — | — |
| PE7 | Enable ™ 2005ME | 0.920 | 0.5 | 40 | 500 | 1,000 | 500 | 2,000 |
| PE8 | ExxonMobil ™ LLDPE LL 1002.09 | 0.918 | 2.0 | — | 1,500 | — | — | — |

[1] $I_2$ = ASTM D1238, 2.16 kg@190° C.
[2] $I_{21}/I_2$; $I_{21}$ = ASTM D1238, 21.6 kg@190° C.
[3] Primary phenolic antioxidant, Irganox ™ 1076, available from BASF, Beaumont, Texas
[4] Phosphitic secondary antioxidant, Irgafos ™ 168, available from BASF, Beaumont, Texas
[5] Slip agent, Kemamide ™ E, available from PMC Biogenix, a subsidiary of PMC Group, Memphis, Tennessee
[6] Anti-block, Optibloc ™ 8 available from Specialty Minerals Inc., a subsidiary of Minerals Technologies Inc., New York City, New York Formulations were prepared by tumble blending the polyethylene granules from Table 2 with the base additive formulations from Table 1 and a PPA/secondary antioxidant combination as specified in the examples below. Once homogenized, each blend was fed into a twin screw 45 mm compounding line and finished into pellets at a target melt temperature of 430° F. (221° C.), a target throughput of 400 lbs/hr (181 kg/hr), and a specific energy input of 230 kWh/ton (209 kWh/tonne). The extrudate was cut into pellets.

Each pellet formulation was tested on a single layer blown film line at a throughput of 25 lbs/hr (11.3 kg/hr), a target melt temperature of 400° F. (204° C.), a die diameter of 2 inches (5.1 cm), a die gap of 30 mil (0.76 mm), and a target frostline of 10 inches (25.4 cm). The pellets containing the PPA component under evaluation are referred to as "test" resins.

Film evaluations were conducted by first cleaning the film line of potential previous PPA contamination. This was accomplished using a "purge" resin. The purge resin in each experiment was the base formulation in Table 2 without the addition of a PPA component, such that the purge resin was matched the test resin that contained the PPA component. The purge resin pellets were produced from the same source polyethylene granules in an identical fashion to the test resin pellets.

A 3:1 w/w blend of purge resin:polybatch KC30 (from LyondellBasell, Houston, Texas) was fed to the film line for approximately 30 minutes, to abrasively clean out all metal surfaces in the equipment. Then, the feed was switched to 100% purge resin and continued until a condition of total melt fracture was reached (typically about 1 hour.)

At this stage, the equipment was considered clean of PPA and other contaminants, and the feed to the film line was switched to the test resin pellets for evaluation of either melt fracture elimination or die lip buildup. The film line evaluation began when the test resin pellets reached the extruder feed throat. Constant throughput was maintained by adjusting the screw speed.

A conventional fluoropolymer-containing PPA (DYNAMAR™ FX5929M) was fed to the extruder at constant mass flow rate which matched the mass flow rate of the mLLDPE. As PPA was fed, the melt fractures slowly began to disappear in streaks as illustrated in FIG. 1. With reference to FIG. 1, as the PPA is added, melt fracture-free regimes begin to emerge as stripes 101 in the machine direction 110 of the film 100 (that is, the direction in which the film is extruded and blown). FIG. 1 is a schematic conceptually illustrating this transitory period with streaks 105 of melt-fractured film material, and the stripes 101 of melt fracture-free film. Over time, these stripes 101 grow in width and the melt fracture zones diminish and are eventually eliminated completely. The PPA and mLLDPE used in each trial are reported in the tables below, further noting that outputs of all trial films normalized for annular die circumference (lbs/hr.-in. die) were maintained within +/−30% of each other.

The film line was "cleaned" as described above after testing with each PPA. The data in Table 15 shows a comparison of films comprising inventive PPA vs. the fluoropolymer-based PPA for the case of same PE resin, same film processing conditions, and similar compounding conditions, such that each fluoropolymer-based PPA provides a "benchmark" for a corresponding example using an inventive PPA. Each film using fluoropolymer-based PPA establishes a "benchmark film" for the corresponding inventive example, meaning that the pairs of corresponding examples were identical films except for the use of fluoropolymer-based PPA vs. inventive PPA.

Melt Fracture

Melt fracture elimination was evaluated by observing: 1) the extent of melt fracture; 2) the extruder pressure drop; 3) the die factor; and 4) the specific output.

The extent of melt fracture was defined as the percent area coverage of the film around the blown bubble of extruded polymer that had visually discernible melt fracture. If the extent of melt fracture has reduced from 100% to 0% within the 105-minute duration, the PPA formulation was considered to be generally preferred.

The extruder pressure drop was the change in extruder pressure relative to the starting condition at the beginning of the test when purge was being fed through the film line. Higher pressure in the extruder can increase the shear stress on the polymer melt as it exits the die. This can lead to melt fracture, which manifests as surface irregularities or roughness on the blown film. Melt fracture typically appears as sharkskin, a wavy or bumpy surface texture, and can worsen at higher pressures and higher shear rates. Alternatively, when extruder pressure drops, the tendency to produce melt fracture decreases. If the pressure drop was substantial, typically a 10-20% pressure drop or more, the PPA formulation was considered to be generally preferred.

The die factor was measured as the polymer throughput (mass/hour) divided by the circumference of the annular die exit (length). The die factor, when defined as the polymer throughput divided by the circumference of the annular die, is closely related to melt fracture because it reflects the flow rate of the polymer through the die, which significantly impacts the shear stress on the molten polymer. Melt fracture is a surface defect that occurs when the polymer experiences high shear rates and uneven flow as it exits the die. As the die factor increases (indicating a higher throughput relative to the die circumference), the polymer flows faster through the die. This higher flow rate results in greater shear stress at the die exit, which can lead to melt fracture. Therefore, it is desirable to maintain or reduce die factor to avoid melt fracture.

The specific output was measured as the polymer throughput (mass/hour) divided by the screw speed (rpm). If the specific output was within a typical range of operation for that film equipment relative to other formulations, and especially not substantially lower, the PPA formulation was considered to be generally preferred, because it indicates no major changes to screw slippage or backflow issues.

The extent of melt fracture, the extruder pressure drop, the die factor, and the specific output were recorded every 15 minutes until either the extent of melt fracture reached 0% or test time reached 105 minutes, whichever came first, at which time the assessment was terminated.

oration, polymer streaks, and/or surface irregularities would be associated with a visual score of 10. The pressure drop is instead defined as the drop from 0 to 2 hours, and a new pressure drift term (defined as the pressure at 20 hours minus the pressure at 2 hours) is considered, which reflects a change in pressure due to equipment fouling.

Experimental Results

Tables 3 through 7 show melt fracture elimination data. Each table shows the melt fracture elimination data for formulations using a particular base resin. The inventive examples for D1/O1 PPA perform better than D1 alone, as evidenced by consistently lower extents of melt fracture and higher pressure drops. O1 performed slightly better than D1/O1, suggesting little added benefit of D1 for melt fracture elimination capability. Notably, the F PPA in example C14 performed very poorly, an indication both of the severity of this melt fracture elimination experiment and the industry knowledge that fluoropolymer-based PPAs often perform less optimally in the presence of anti-block. This PPA-anti-block antagonism does not appear prevalent for combinations of D1 and O1.

Comparative Examples C1 and C2 in Table 3 show the performance of different concentrations of a polyamide PPA in PE1. Comparative Examples C3 and C4 show the performance of different concentrations of a polyphosphite PPA in PE1. Inventive Examples I5 and I6 show the performance of different concentrations of a combination of polyamide PPA and polyphosphite PPA and in PE1.

Inventive Examples I5 and I6 show a reduced extent of melt fracture and an increase in pressure drop relative to comparative Examples C3 and C4 indicating improved performance for the PA/PPI PPA. Values for die factor and specific output are similar for all examples in Table 3.

TABLE 3

| Ex. | Base | PPA formulation | Final extent of melt fracture (%) | Pressure drop (%) | Die factor (lb/hr-in) | Specific output (lb/hr-rpm) |
|---|---|---|---|---|---|---|
| C1 | PE1 | 1 ppt O1 | 0 | 19 | 3.7 | 1.1 |
| C2 | PE1 | 2 ppt O1 | 0 | 16 | 4.4 | 1.3 |
| C3 | PE1 | 1 ppt D1 w/o secondary AO* | 10 | 0 | 3.9 | 1.2 |
| C4 | PE1 | 1.6 ppt D1 w/o secondary AO* | 5 | 1 | 4.0 | 1.3 |
| I5 | PE1 | 1 ppt D1/1 ppt O1 | 0.1 | 9 | 4.1 | 1.3 |
| I6 | PE1 | 1 ppt D1/2 ppt O1 | 0.1 | 6 | 4.1 | 1.2 |

*The base quantity of the generic phosphitic secondary antioxidant was removed since D1 can also fulfill this role.

Die Lip Buildup

Die lip buildup evaluations were conducted following the same film protocol as melt fracture elimination evaluations, but with three exceptions: 1) the test duration was 20 hours, 2) the data sampling interval was 2 hours, and 3) the throughput was increased to near the upper pressure limit of the extruder, about 35-45 lbs/hr (16-20 kg/hr), to accelerate the buildup process. A visual score between 1 and 10 (1 being minimal die lip build up, and 10 being the most severe die lip buildup) was given to the die exit based on the extent of buildup. Such visual inspection can be calibrated by correlation of the amount of observed die lip buildup when the film being produced prior to such inspection exhibited no discoloration, polymer streaks, and surface irregularities and associating this condition with a visual score of 1. At the opposite end of the scale, correlation of the amount of observed die lip buildup when the film being produced prior to such inspection exhibited the worst demonstrated discol- Comparative Example C7 in Table 4 shows the benchmark performance of a fluoropolymer-containing PPA in PE2. Comparative Examples C8 and C9 in Table 4 show the performance of different concentrations of a polyamide PPA in PE2. Comparative Examples C10 and C11 show the performance of different concentrations of a polyphosphite PPA in PE2. Inventive Examples I12 and I13 show the performance of different concentrations of a combination of polyamide PPA and polyphosphite PPA and in PE2.

Inventive Examples I12 and I13 show a similar extent of melt fracture and similar pressure drop relative to comparative Examples C8 through C11 indicating equivalent performance for the PA/PPI PPA. Values for die factor and specific output are similar for all examples in Table 4.

TABLE 4

| Ex. | Base | PPA formulation | Final extent of melt fracture (%) | Pressure drop (%) | Die factor (lb/hr-in) | Specific output (lb/hr-rpm) |
|---|---|---|---|---|---|---|
| C7 | PE2 | 0.4 ppt F | 0 | 22 | 4.0 | 1.4 |
| C8 | PE2 | 1 ppt O1 | 0 | 12 | 3.9 | 1.3 |
| C9 | PE2 | 2 ppt O1 | 0 | 12 | 4.1 | 1.3 |
| C10 | PE2 | 1 ppt D1 w/o secondary AO* | 0.1 | 12 | 4.1 | 1.4 |
| C11 | PE2 | 1.6 ppt D1 w/o secondary AO* | 0 | 15 | 4.1 | 1.4 |
| I12 | PE2 | 1 ppt D1/1 ppt O1 | 0 | 10 | 4.2 | 1.5 |
| I13 | PE2 | 1 ppt D1/2 ppt O1 | 0 | 15 | 4.2 | 1.5 |

*The base quantity of the generic phosphitic secondary antioxidant was removed since D1 can also fulfill this role.

Comparative Example C14 in Table 5 shows the benchmark performance of a fluoropolymer-containing PPA in PE3. Comparative Examples C15 and C16 in Table 5 show the performance of different concentrations of a polyphosphite PPA in PE3. Inventive Examples I17 and I18 show the performance of different concentrations of a combination of polyamide PPA and polyphosphite PPA and in PE3.

It is believed that comparative Example C14 performed poorly due to a negative interaction between the fluoropolymer-based PPA and the anti-block. This PPA-anti-block antagonism does not appear to exist for combinations of D1 and O1.

Inventive Examples I17 and I18 show a similar extent of melt fracture relative to comparative Examples C15 and C16 indicating equivalent performance for the PA/PPI PPA. Increased pressure drop for inventive Examples I17 and I18 relative to comparative Examples C15 and C16 indicate improved performance for the PA/PPI PPA. Values for die factor and specific output are similar for all examples in Table 5.

TABLE 5

| Ex. | Base | PPA formulation | Final extent of melt fracture (%) | Pressure drop (%) | Die factor (lb/hr-in) | Specific output (lb/hr-rpm) |
|---|---|---|---|---|---|---|
| C14 | PE3 | 0.6 ppt F | 52 | 13 | 4.0 | 1.4 |
| C15 | PE3 | 1 ppt D1 w/o secondary AO* | 0 | 11 | 4.1 | 1.4 |
| C16 | PE3 | 1.6 ppt D1 w/o secondary AO* | 0 | 10 | 4.0 | 1.4 |
| I17 | PE3 | 1 ppt D1/1 ppt O1 | 0 | 16 | 4.2 | 1.4 |
| I18 | PE3 | 1 ppt D1/2 ppt O1 | 0 | 18 | 4.2 | 1.4 |

*The base quantity of the generic phosphitic secondary antioxidant was removed since D1 can also fulfill this role.

-

Comparative Example C19 in Table 6 shows the performance of a polyphosphite PPA in PE4. Comparative Example C20 in Table 6 shows the performance of a polyamide PPA in PE4. Inventive Example I21 shows the performance of a combination of polyamide PPA and polyphosphite PPA and in PE4.

Inventive Example I21 shows a similar extent of melt fracture relative to comparative Examples C19 and C20 indicating equivalent performance for the PA/PPI PPA. Increased pressure drop for inventive Example I21 relative to comparative Example C19 indicates improved performance for the PA/PPI PPA. Values for die factor and specific output are similar for all examples in Table 6.

TABLE 6

| Ex. | Base | PPA formulation | Final extent of melt fracture (%) | Pressure drop (%) | Die factor (lb/hr-in) | Specifi coutput (lb/hr-rpm) |
|---|---|---|---|---|---|---|
| C19 | PE4 | 1 ppt D1 w/o secondary AO* | 0.5 | −8 | 4.0 | 1.3 |
| C20 | PE4 | 2 ppt O1 | 0 | 9 | 3.8 | 1.2 |
| I21 | PE4 | 1 ppt D1/1.5 ppt O1 w/o secondary AO* | 0 | 6 | 4.0 | 1.3 |

*The base quantity of the generic phosphitic secondary antioxidant was removed since D1 can also fulfill this role.

Comparative Example C22 in Table 7 shows the performance of a polyphosphite PPA in PE5. Comparative Example C23 in Table 7 shows the performance of a polyamide PPA in PE5. Inventive Example I24 shows the performance of a combination of polyamide PPA and polyphosphite PPA and in PE5.

Inventive Example I24 shows a reduced extent of melt fracture and increased pressure drop relative to comparative Example C22 indicating equivalent performance for the PA/PPI PPA. Values for die factor and specific output are similar for all examples in Table 7.

TABLE 7

| Ex. | Base | PPA formulation | Final extent of melt fracture (%) | Pressure drop (%) | Die factor (lb/hr-in) | Specific output (lb/hr-rpm) |
|---|---|---|---|---|---|---|
| C22 | PE5 | 1 ppt D1 w/o secondary AO* | 8 | 1 | 3.9 | 1.3 |
| C23 | PE5 | 2 ppt O1 | 0 | 21 | 4.0 | 1.3 |
| I24 | PE5 | 1 ppt D1/1.5 ppt O1 w/o secondary AO* | 0 | 9 | 4.2 | 1.4 |

*The base quantity of the generic phosphitic secondary antioxidant was removed since D1 can also fulfill this role.

Tables 8 and 9 show die lip buildup data, one table for each base resin formulation considered: PE2 and PE3. Melt fracture was fully eliminated in all cases within 2 hours or less, in general agreement with the PE2 and PE3 formulations of Tables 4 and 5. The inventive examples for D1/O1 PPA perform better than O1 alone, as evidenced by consistently lower extents of visually observable buildup, similar or lower pressure drifts, and the lack of tendency for melt fracture to return sometime later after eliminating as in the case of example C28. Buildup-induced melt fracture is believed to occur in PPA formulations with a high propensity for die lip buildup, because of their tendency to foul metal surfaces and introduce additional surface roughness. D1 performed slightly better than D1/O1, suggesting little added benefit of O1 for die lip buildup mitigation.

Comparative Example C25 in Table 8 shows the performance of a polyamide PPA in PE2. Comparative Example C26 in Table 8 shows the performance of a polyphosphite PPA in PE2. Inventive Example I27 shows the performance of a combination of polyamide PPA and polyphosphite PPA and in PE2.

Although the magnitude of the initial pressure drop and a pressure drift pressure drop values for inventive Example I27 are less than those of comparative Example C25, both values are meaningful and in the correct direction. In contrast, the initial pressure drop of comparative Example C26 has a negative value, and the cumulative magnitude of the initial pressure drop and the pressure drift is 0. This shows that the O1 and D1/O1 PPAs provide desired pressure drop performance, while the D1 PPA has no impact on pressure drop.

With respect to die lip buildup, both comparative Example C26 and inventive Example I27 show better performance than comparative Example C25. This shows that the D1 and D1/O1 PPAs provide reduced die lip buildup relative to D1 PPA.

This data suggests that the D1/O1 PPA provides a desirable balance of higher pressure drop and reduced die lip buildup, while O1 alone provides improved pressure drop but poorer die lip buildup performance, and D1 alone provides improved die lip buildup performance but poorer pressure drop performance.

Values for die factor and specific output are similar for all examples in Table 8.

TABLE 8

| Ex. | Base | PPA formulation | Init. Press. drop, 0 hr-2 hr (%) | Press. drift, 20 hr-2 hr (%) | Die factor (lb/hr-in) | Specific output (lb/hr-rpm) | Visual die lip buildup score (1-10) |
|---|---|---|---|---|---|---|---|
| C25 | PE2 | 2 ppt O1 | 8 | 5 | 5.8 | 1.3 | 4 |
| C26 | PE2 | 1 ppt D1 w/o secondary AO* | −1 | 1 | 4.8 | 1.4 | 1 |
| I27 | PE2 | 1 ppt D1/1.5 ppt O1 w/o secondary AO* | 5 | 4 | 6.0 | 1.4 | 1 |

*The base quantity of the generic phosphitic secondary antioxidant was removed since D1 can also fulfill this role.

Comparative Example C28 in Table 9 shows the performance of a polyamide PPA in PE3. Comparative Example C29 in Table 9 shows the performance of a polyphosphite PPA in PE3. Inventive Example I30 shows the performance of a combination of polyamide PPA and polyphosphite PPA and in PE3.

Although the magnitude of the initial pressure drop and a pressure drift pressure drop values for inventive Example I30 are less than those of comparative Example C28, both values are meaningful and cumulatively in the correct direction. In contrast, the initial pressure drop and the pressure drift of comparative Example C29 both have negative values. This shows that the O1 and D1/O1 PPAs provide desired pressure drop performance, while the D1 PPA has a negative effect on pressure drop.

With respect to die lip buildup, all of comparative Examples C28 and C29 and inventive Example I30 show equivalent performance.

This data suggests that the D1/O1 PPA and the O1 PPA both provide a desirable balance of higher pressure drop and reduced die lip buildup, while D1 alone provides equivalent die lip buildup performance but poorer pressure drop performance.

Values for die factor and specific output are similar for all examples in Table 9.

TABLE 9

| Ex. | Base | PPA formulation | Init. Press. drop, 0 hr-2 hr (%) | Press. drift, 20 hr-2 hr (%) | Die factor (lb/hr-in) | Specific output (lb/hr-rpm) | Visual die lip buildup score (1-10) |
|---|---|---|---|---|---|---|---|
| C28** | PE3 | 2 ppt O1 | 9 | 0 | 6.0 | 1.3 | 1 |
| C29 | PE3 | 1 ppt D1 w/o secondary AO* | 3 | −3 | 5.0 | 1.4 | 1 |
| I30 | PE3 | 1 ppt D1/1.5 ppt O1 w/o secondary AO | 3 | −1 | 6.2 | 1.4 | 1 |

*The base quantity of the generic phosphitic secondary antioxidant was removed since D1 can also fulfill this role.
**Melt fracture returned, increasing its % extent from 0 to 0.4% at approximately the 10-hour mark.

Inventive Examples I31-I36 in Table 10 show the performance of PE2 blended with polyamide/polyphosphite PPAs having varying amounts and ratios of polyamide and polyphosphite.

All of Inventive Examples I31-I36 show a 0% extent of melt fracture and a favorable magnitude of pressure drop.

Values for die factor and specific output are similar for all examples in Table 10.

TABLE 10

| Ex. | Base | PPA formulation | Final extent of melt fracture (%) | Pressure drop (%) | Die factor (lb/hr-in) | Specific output (lb/hr-rpm) |
|---|---|---|---|---|---|---|
| I31 | PE2 | 0.5 ppt D1/0.5 ppt O1 w/o secondary AO* | 0 | 15 | 4.1 | 1.4 |
| I32 | PE2 | 0.5 ppt D1/1 ppt O1 w/o secondary AO* | 0 | 14 | 4.0 | 1.4 |
| I33 | PE2 | 1 ppt D1/1 ppt O1 w/o secondary AO* | 0 | 11 | 4.1 | 1.4 |
| I34 | PE2 | 1 ppt D1/0.5 ppt O1 w/o secondary AO* | 0 | 11 | 4.0 | 1.3 |
| I35 | PE2 | 1 ppt D1/1.5 ppt O1 w/o secondary AO* | 0 | 22 | 3.7 | 1.3 |
| I36 | PE2 | 0.3 ppt D1/0.3 ppt O1 | 0 | 17 | 4.2 | 1.5 |

*The base quantity of the generic phosphitic secondary antioxidant was removed.

Inventive Examples I37-I42 in Table 11 show the performance of PE1 blended with polyamide/polyphosphite PPAs having varying amounts and ratios of polyamide and polyphosphite.

All of Inventive Examples I37-I42 show a 0% extent of melt fracture and a favorable magnitude of pressure drop.

Values for die factor and specific output are similar for all examples in Table 11.

TABLE 11

| Ex. | Base | PPA formulation | Final extent of melt fracture (%) | Pressure drop (%) | Die factor (lb/hr-in) | Specific output (lb/hr-rpm) |
|---|---|---|---|---|---|---|
| I37 | PE1 | 1 ppt D1/1 ppt O1 w/o secondary AO* | 0 | 12 | 3.9 | 1.3 |
| I38 | PE1 | 1 ppt D1/2 ppt O1 w/o secondary AO* | 0 | 9 | 4.1 | 1.3 |
| I39 | PE1 | 1.8 ppt D1/2 ppt O1 w/o secondary AO* | 0 | 15 | 3.9 | 1.3 |
| I40 | PE1 | 1 ppt D1/2 ppt ODMB w/o secondary AO* | 6 | 8 | 4.0 | 1.3 |
| I41 | PE1 | 1 ppt D1/4 ppt ODMB w/o secondary AO* | 0 | 20 | 3.9 | 1.3 |

TABLE 11-continued

| Ex. | Base | PPA formulation | Final extent of melt fracture (%) | Pressure drop (%) | Die factor (lb/hr-in) | Specific output (lb/hr-rpm) |
|---|---|---|---|---|---|---|
| I42 | PE1 | 1 ppt D1/4 ppt ODMB w/o secondary AO* | 0 | 12 | 3.8 | 1.3 |

*The base quantity of the generic phosphitic secondary antioxidant was removed.

Comparative Examples C43-C48 in Table 12 show the performance of PE1, PE2, and PE3 blended with varying amounts of polycaprolactone PPAs.

All of Comparative Examples C43-C48 show unfavorably high extent of melt fracture values and unfavorably low pressure drop values.

Values for die factor and specific output are similar for all examples in Table 12.

TABLE 12

| Ex. | Base | PPA formulation | Final extent of melt fracture (%) | Pressure drop (%) | Die factor (lb/hr-in) | Specific output (lb/hr-rpm) |
|---|---|---|---|---|---|---|
| C43 | PE1 | 0.8 ppt IN1 | 10 | 1 | 4.1 | 1.3 |
| C44 | PE1 | 1.5 ppt IN1 | 2 | 3 | 3.9 | 1.2 |
| C45 | PE2 | 0.8 ppt IN1 | 7 | 7 | 4.1 | 1.4 |
| C46 | PE2 | 1.5 ppt IN1 | 3 | 10 | 4.0 | 1.4 |
| C47 | PE3 | 0.8 ppt IN1 | 40 | 4 | 4.1 | 1.4 |
| C48 | PE3 | 1.5 ppt IN1 | 8 | 4 | 4.1 | 1.4 |

Comparative Examples C49-C53 in Table 13 show the performance of PE1, PE2, PE3, PE4, and PE5 blended with polyethylene glycol PPAs.

All of Comparative Examples C49-C53 show 0% extent of melt fracture except for PE5 and favorably high pressure drop values.

Values for die factor and specific output are similar for all examples in Table 13.

TABLE 13

| Ex. | Base | PPA formulation | Final extent of melt fracture (%) | Pressure drop (%) | Die factor (lb/hr-in) | Specific output (lb/hr-rpm) |
|---|---|---|---|---|---|---|
| C49 | PE1 | 1 ppt E1 | 0 | 22 | 4.1 | 1.3 |
| C50 | PE2 | 1 ppt E1 | 0 | 25 | 4.0 | 1.5 |
| C51 | PE3 | 1 ppt E1 | 0 | 24 | 3.8 | 1.3 |
| C52 | PE4 | 1 ppt E1 | 0 | 19 | 4.1 | 1.3 |
| C53 | PE5 | 1 ppt E1 | 0.05 | 19 | 4.1 | 1.4 |

Comparative Examples C54 and C55 in Table 14 show the performance of PE2 and PE3 blended with polyethylene glycol PPAs.

Comparative Example C54 shows unfavorable die lip buildup. Comparative Example C55 shows better die buildup performance but less favorable pressure drop than Comparative Example C54. Therefore, although Table 13 suggests that E1 provides good performance for mitigation of melt fracture, table 14 shows that it is less effective in preventing die lip buildup.

Values for die factor and specific output are similar for all examples in Table 14.

TABLE 14

| Ex. | Base | PPA formulation | Initial pressure drop, 0 hr-2 hr (%) | Pressure drift, 20 hr-2 hr (%) | Die factor (lb/hr-in) | Specific output (lb/hr-rpm) | Visual die lip buildup score (1-10) |
|---|---|---|---|---|---|---|---|
| C54* | PE2 | 1 ppt E1 | 13 | 0 | 6.3 | 1.4 | 10 |
| C55 | PE3 | 1 ppt E1 | 8 | −1 | 6.6 | 1.5 | 1 |

*Melt fracture returned, increasing its % extent from 0 to 2% at approximately the 6-hour mark.

Films were blown below from pellets. All pellets were compounded in the same way as previously explained. Films were blown on a 6" diameter mono die with a die gap of 60 mil for the cases of PE2 and PE3 based formulations and 30 mil for the cases of PE6 and PE7 based formulations. Output was 200 lbs/hr, BUR was 2.5, target melt temperature was 400-440 F, and film gauge was 1 mil. Comparative Examples C56, C58, C60, and C62 in Table show the performance of PE6, PE2, PE7, and PE3, respectively, blended with fluoropolymer-containing PPA. Inventive Examples I57, I59, I61, and I63 in Table 15 show the performance of PE6, PE2, PE7, and PE3, respectively, blended with polyamide/polyphosphite PPA.

Generally, the comparative example film can be directly compared to the following inventive example—the only difference in consecutive pairs of examples is the PPA used (e.g., Examples C56 and 157 comprise fluoropolymer-containing PPA and polyamide/polyphosphite PPA, respectively). The examples in Table 15 show that films prepared from polyolefins blended with pairs is the polyamide/polyphosphite PPA have mechanical and/or optical properties comparable to films prepared from the same polyolefins blended with fluoropolymer PPA.

TABLE 15

| Ex. | Base | PPA formulation | MD 1% secant modulus (psi) | Dart A (g/mil) | MD Tear (g/mil) | MD Gloss 45° (GU) | Haze Total (%) |
|---|---|---|---|---|---|---|---|
| C56 | PE6 | 0.5 ppt F | 29,200 | 230 | 81 | 48 | 11 |
| I57 | PE6 | 1 ppt D1/1.5 ppt O1 w/o secondary AO* | 29,200 | 230 | 93 | 49 | 10 |
| C58 | PE2 | 0.4 ppt F | 27,200 | 680 | 240 | 69 | 6.0 |
| I59 | PE2 | 1 ppt D1/1.5 ppt O1 w/o secondary AO* | 24,900 | 730 | 240 | 57 | 9.5 |
| C60 | PE7 | 0.5 ppt F | 28,800 | 230 | 82 | 43 | 13 |
| I61 | PE7 | 1 ppt D1/1.5 ppt O1 w/o secondary AO* | 29,100 | 240 | 83 | 44 | 12 |
| C62 | PE3 | 0.6 ppt F | 26,600 | 720 | 280 | 51 | 12 |
| I63 | PE3 | 1 ppt D1/1.5 ppt O1 w/o secondary AO* | 25,700 | 750 | 260 | 45 | 16 |

*The base quantity of the generic phosphitic secondary antioxidant was removed.

In summary, the trends in the foregoing examples show that PPI PPA alone helps reduce melt fracture but has limited effect on die lip buildup. It is further shown that that PA PPA alone helps reduce die lip buildup but as limited effect on melt fracture. Surprisingly, it has been discovered that PPAs comprising a blend of PA and PPI provides a reduction in both melt fracture and die lip buildup without negatively impacting film properties.

Test Methods

Table 16 below reports the test methods used in connection with the examples. Unless stated otherwise in the description of a given property, these methods are also to be 10 used in determining properties in accordance with embodiments described herein.

TABLE 16

| Test/Parameter Name | Method or description |
|---|---|
| Melt index, high load melt index | ASTM D-1238 2.16 kg (melt index) or 21.6 kg (high load melt index), 190° C. |
| Melt index ratio | High load melt index/melt index |
| Density | ASTM D1505, column density. Samples were molded under ASTM D4703-10a, Procedure C, then conditioned under ASTM D618-08 (23° ± 2° C. and 50 ± 10% relative humidity) for 40 hours before testing |
| Percent melt fracture coverage | Measured by eye. The fraction of melt fracture Estimated visually from a 2-ft long sample of film, taken as a percentage of the area with noticeable, characteristic melt fracture roughness. Clear delineation existed between the melt fractured regions and the smooth, melt fracture free regions of the sample. |

TABLE 16-continued

| Test/Parameter Name | Method or description |
|---|---|
| Pressure | Read off the in-line calibrated pressure transducer of the blown film line extruder, before the screen-pack, and recorded. |
| Die factor | Output (lb/hr)/die circumference (in). Output (lb/hr) = film sample weight (g, determined from a sample as measured on a tared, calibrated weight scale) × line speed (fpm, determined from an in-line tachometer) ÷ film sample length (in, measured by yard stick) × 1.59 lb-in-min/g-ft-hr |
| Die Gap | The spacing (mil) between inner and outer walls of an extrusion die. For example, where a die is such that polymer is extruded through the annulus defined by the outer wall of an inner cylinder, and the inner wall of an outer cylinder (which is concentric with the inner cylinder), the die gap is the measurement (distance, mil) between outer wall of the inner cylinder, and inner wall of the outer cylinder. |
| Specific output | Output (1b/hr)/extruder speed (rpm). Output is computed as with die factor. Extruder speed measured by in-line tachometer. |
| 1% Secant Modulus | ASTM D-882, 15 mm width strip |
| Yield Strength | ASTM D-882, 15 mm width strip |
| Tensile Strength | ASTM D-882, 15 mm width strip |
| Elongation at Break | ASTM D-882, 15 mm width strip |
| Elongation at Yield | ASTM D-882, 15 mm width strip |
| Dart Drop | ASTM D-1709, Phenolic, Method A |
| Haze | ASTM D-1003 |
| Gloss, 45° | ASTM D-2457 - machine direction (MD) |
| Elmendorf Tear | ASTM D-1922 with conditioning for 40 hours at 23° ± 2° C. and 50 ± 10% relative humidity |
| Puncture | Modified ASTM D-5748: ASTM probe was used with two 0.25 mil HDPE slip sheets. Machine Model: United SFM-1. Testing speed: 10 in/min |
| Heat Seal | Method using 1 inch film strip of 1 mil gauge, sealed at various temperatures under 73 psi (0.5 N/mm$^2$) for 1 second. Following conditioning for 40 hours at 23° ± 2° C. and 50 ± 10% relative humidity, the sealed specimen were tested in T-joint peel mode at 20 inch/min pulling speed |

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby.

While the present disclosure has been described with respect to a number of embodiments and examples, those skilled in the art, having the benefit of this disclosure, will appreciate that other embodiments can be devised which do not depart from the scope and spirit of the present disclosure.

What is claimed is:

1. A polymer composition comprising:

a $C_2$-$C_6$ olefin homopolymer or a copolymer of two or more $C_2$-$C_{20}$ α-olefins; and a polymer processing aid;

wherein:

the polymer processing aid comprises a mixture of one or more polyamides and one or more polyphosphites;

the one or more polyamides are selected from a group consisting of aliphatic polyamides;

the mixture is present in the polymer composition in an amount in the range of from 560 ppm to 4,400 ppm; and the polymer composition is substantially free of fluorine.

2. The polymer composition of claim 1, wherein the mixture is present in the polymer processing aid in an amount greater than or equal to 80 wt %.

3. The polymer composition of claim 1, wherein the weight ratio of the one or more polyamides to the one or more polyphosphites is in the range of from 6:1 to 1:25.

4. The polymer composition of claim 1, wherein the one or more polyamides is present in the polymer composition in an amount in the range of from 160 ppm to 2,200 ppm.

5. The polymer composition of claim 1, wherein each of the one or more polyamides comprises particulate matter having a particle size in the range of from 2 to 1,500 microns.

6. The polymer composition of claim 1, wherein each of the one or more polyamides has:

a low load melt index (LLMI) according to ASTM D-1238, 2.16 kg at 230° C. in the range of from 30 dg/min to 50 dg/min;

a medium load melt index (MLMI) according to ASTM D-1238, 5 kg at 230° C. in the range of from 110 dg/min to 160 dg/min; or a combination thereof.

7. The polymer composition of claim 1, wherein the one or more polyphosphites is present in the polymer composition in an amount in the range of from 400 ppm to 2,200 ppm.

8. The polymer composition of claim 1, wherein each of the one or more polyphosphites comprises an alkyl polyphosphite, an aryl polyphosphite, a cyclic polyphosphite, an oligomeric polyphosphite, a mixed polyphosphite, a high-performance phosphite polymer, or a combination thereof.

9. The polymer composition of claim 8, wherein the one or more polyphosphites are described by one or more of Formula (I), Formula (II), Formula (III), and Formula (IV), as shown below:

(I)

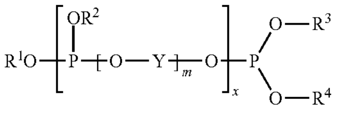

wherein:

each $R^1$, $R^2$, $R^3$ and $R^4$ can be the same or different and independently selected from the group consisting of $C_{12-20}$ alkyl, $C_{12-22}$ alkenyl, $C_{12-40}$ cycloalkyl, $C_{12-40}$ cycloalkylene, $C_{12-20}$ alkyl glycol ethers and Y—OH as an end-capping group;

each Y is independently selected from the group consisting of $C_{2-40}$ alkylene, $C_{7-40}$ cycloalkylene, $C_{3-20}$ alkyl glycol ethers, $C_{3-40}$ alkyl lactone, and —$R^7$—N($R^8$)—$R^9$—;

$R^7$, $R^8$ and $R^9$ are independently selected from the group consisting of $C_{1-20}$ alkyl, $C_{2-22}$ alkenyl, $C_{6-40}$ cycloalkyl, $C_{7-40}$ cycloalkylene and H;

m is an integral value ranging from 1 to 100 inclusive;

x is an integral value ranging from 2 to 1,000 with the proviso that when —O—Y is a $C_{3-20}$ alkyl glycol ether, x is an integral value no less than 7; and no more than two of $R^1$, $R^2$, $R^3$ and $R^4$ are terminated with an hydroxyl group;

(II)

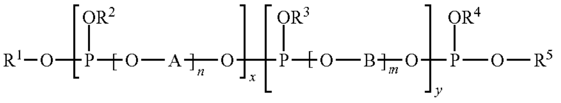

wherein:

each $R^1$, $R^2$, $R^3$, $R^4$ and $R^5$ can be the same or different and independently selected from the group consisting of $C_{12-20}$ alkyl, $C_{12-22}$ alkenyl, $C_{12-40}$ cycloalkyl, $C_{12-40}$ cycloalkenyl, $C_{12-20}$ alkyl glycol ethers and A-OH and B—OH as an end-capping groups;

each A and B are different and independently selected from the group consisting of $C_{2-40}$ alkylene, $C_{7-40}$ cycloalkylene, $C_{3-20}$ alkyl glycol ethers, $C_{3-40}$ alkyl lactone, and —$R^7$—N($R^8$)—$R^9$— wherein $R^7$, $R^8$ and $R^9$ are independently selected from the group $C_{1-20}$ alkyl, $C_{2-22}$ alkenyl, $C_{6-40}$ cycloalkyl, $C_{7-40}$ cycloalkylene and H;

m and n are integral values ranging from 1 to 100 inclusive;

x and y are integral values ranging from 1 to 1,000 wherein x+y sum to at least 3, with the proviso that when —O-A or —O—B are $C_{3-20}$ alkyl glycol ethers, at least one of x or y is an integral value no less than 7; and no more than two of $R^1$, $R^2$, $R^3$, $R^4$ and $R^5$ are terminated with a hydroxyl group;

(III)

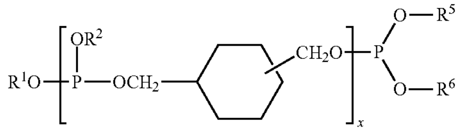

wherein:

each $R^1$, $R^2$, $R^5$ and $R^6$ can be the same or different and independently selected from the group consisting of $C_{1-20}$ alkyl, $C_{2-22}$ alkenyl, $C_{6-40}$ cycloalkyl, $C_{7-40}$ cycloalkylene, $C_{3-20}$ methoxy alkyl glycol ethers, $C_{3-20}$ alkyl glycol ethers or Y—OH (serving as an end capping moiety) for $R^1$, $R^2$, $R^5$ and $R^6$;

Y is selected from the group consisting of $C_{2-40}$ alkylene, $C_{2-40}$ alkyl lactone, and $C_{2-40}$ cycloalkyl and further comprises $C_{2-20}$ alkyl glycol ethers when Y is in the polyphosphite backbone; and x is an integral value ranging from 8 to 1,000; and (IV)

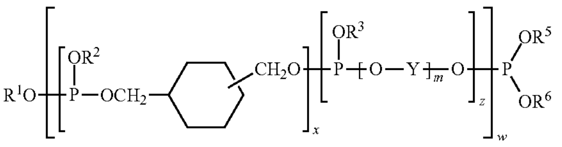

wherein:

where each $R^1$, $R^2$, $R^3$, $R^4$, $R^5$ and $R^6$ can be the same or different and independently selected from the group consisting of $C_{1-20}$ alkyl, $C_{2-22}$ alkenyl, $C_{6-40}$ cycloalkyl, $C_{7-40}$ cycloalkylene, $C_{3-20}$ methoxy alkyl glycol ethers, $C_{3-20}$ alkyl glycol ethers or Y—OH (serving as an end capping moiety) for $R^1$, $R^2$, $R^3$, $R^4$, $R^5$ and $R^6$;

Y is selected from the group consisting of $C_{2-40}$ alkylene, $C_{2-40}$ alkyl lactone, and $C_{2-40}$ cycloalkyl and further comprises $C_{2-20}$ alkyl glycol ethers when Y is in the polyphosphite backbone (e.g., ethylene, propylene, caprylactone, polyalkylene glycol);

x is an integral value ranging from 8 to 1,000;

z is an integral value ranging from 0 to 1,000 with the proviso that when z is 8 or greater, then x is an integral value ranging from 1 to 1,000;

m is an integral value ranging from 1 to 20; and w is an integral value ranging from 1 to 1,000.

10. The polymer composition of claim 1, wherein the one or more polyamides is PA-12.

11. The polymer composition of claim 1, wherein each of the one or more polyphosphites has:

a number average molecular number ($M_n$) in the range of from 500 to 5,000 g/mol;

a weight average molecular weight ($M_w$) in the range of from 1,000 to 10,000 g/mol; or a combination thereof.

12. The polymer composition of claim 1, wherein:

the polymer composition comprises an ethylene copolymer comprising units derived from ethylene and units derived from one or more $C_3$ to $C_{20}$ α-olefins; and the ethylene copolymer has density within the range from 0.905 to 0.945 g/cm$^3$ and melt index (ASTM D1238 at 190° C., 2.16 kg loading) within the range from 0.1 to 5.0 g/10 min.

13. The polymer composition of claim 12, wherein the ethylene copolymer is metallocene-catalyzed linear low density polyethylene (mLLDPE), comprising units derived from ethylene and units derived from 1-butene, 1-hexene, or 1-octene.

14. The polymer composition of claim 1, wherein the polymer composition has been formed by a process comprising melt-blending the mixture of one or more polyamides and one or more polyphosphites and the homopolymer or copolymer so as to obtain the polymer composition having homogenously distributed mixture among the homopolymer or copolymer.

15. The polymer composition of claim 1, wherein at least a portion of the polymer processing aid is provided to the polymer composition in the form of a masterbatch comprising the polymer processing aid in a carrier resin.

16. A blown film made from the polymer composition of claim 1, wherein the film, when compared to a benchmark film, has:

i. a 1% secant modulus (MD) within ±15% of the value (psi) of the benchmark film;

ii. a dart drop within ±15% of the value (g) of the benchmark film;

iii. an Elmendorf tear (MD) within ±20% of the value (g/mil) benchmark film;

iv. a MD gloss 45° within ±15 GU of the value (in GU) of the benchmark film, and/or MD gloss 45° greater than or equal to 40 GU;

v. a total haze within ±15% haze of the value (in % haze) of the benchmark film, and/or total haze less than or equal to 20%; or vi. a combination thereof;

wherein the benchmark film is made using a fluoropolymer-based polymer processing aid instead of the polymer processing aid comprising the mixture of one or more polyamides and one or more polyphosphites but is otherwise identical to the film.

* * * * *